United States Patent
Chowdhury et al.

(10) Patent No.: US 10,306,654 B2
(45) Date of Patent: May 28, 2019

(54) APPLICATION INTELLIGENCE CONTROLLER

(71) Applicant: AltioStar Networks, Inc., Tewksbury, MA (US)

(72) Inventors: Kuntal Chowdhury, Andover, MA (US); Si Nguyen, Tewksbury, MA (US); Anupam Kumar Goel, Bangalore (IN); Ashraf M. Dahod, Andover, MA (US)

(73) Assignee: AltioStar Networks, Inc., Tewksbury, MA (US)

( * ) Notice: Subject to any disclaimer, the term of this patent is extended or adjusted under 35 U.S.C. 154(b) by 151 days.

(21) Appl. No.: 15/094,121

(22) Filed: Apr. 8, 2016

(65) Prior Publication Data

US 2016/0302212 A1    Oct. 13, 2016

Related U.S. Application Data

(60) Provisional application No. 62/145,339, filed on Apr. 9, 2015.

(51) Int. Cl.
*H04W 72/08* (2009.01)
*H04L 29/08* (2006.01)
(Continued)

(52) U.S. Cl.
CPC ....... *H04W 72/085* (2013.01); *H04L 67/2842* (2013.01); *H04W 36/0011* (2013.01); *H04W 36/30* (2013.01); *H04W 88/08* (2013.01)

(58) Field of Classification Search
CPC .......... H04L 67/2842; H04W 36/0011; H04W 36/30; H04W 72/085; H04W 88/08; H04W 72/04; H04W 72/12; H04W 76/00; H04B 7/2121; H04B 7/2123; H04J 2203/0069; H04Q 2213/394
(Continued)

(56) References Cited

U.S. PATENT DOCUMENTS

2002/0115443 A1* 8/2002 Freiberg ................ H04L 1/0002
                                                                455/450
2007/0206635 A1* 9/2007 Pozhenko ............... H04L 47/10
                                                                370/473

(Continued)

FOREIGN PATENT DOCUMENTS

WO    WO-2015031271 A2    3/2015

OTHER PUBLICATIONS

Partial International Search Report for Application No. PCT/US2016/026638, dated Jun. 27, 2016.
(Continued)

*Primary Examiner* — Robert J Lopata
(74) *Attorney, Agent, or Firm* — Mintz Levin Cohn Ferris Glovsky and Popeo, P.C.

(57) ABSTRACT

A system, a method, an apparatus, and a computer program product for transmission of data packets are disclosed. A determination is made whether an application service is being consumed by user equipment. Channel quality information is obtained for a channel being used by the user equipment to consume the application service. Based on the obtained channel quality information, a treatment is applied to the application service being consumed by the user equipment.

45 Claims, 16 Drawing Sheets

(51) Int. Cl.
*H04W 36/00* (2009.01)
*H04W 88/08* (2009.01)
*H04W 36/30* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2008/0080469 A1* | 4/2008 | Kolding | ................ | H04W 28/24 370/342 |
| 2008/0309748 A1* | 12/2008 | Franceschini | ....... | H04W 76/025 348/14.01 |
| 2010/0212006 A1* | 8/2010 | Dolganow | ............ | H04L 67/104 726/14 |
| 2011/0038304 A1* | 2/2011 | Lin | ....................... | H04W 28/08 370/328 |
| 2012/0093074 A1 | 4/2012 | Sairanen et al. | | |
| 2012/0250686 A1* | 10/2012 | Vincent | ............... | H04L 12/4633 370/392 |
| 2012/0281558 A1* | 11/2012 | Anderson | ............ | H04W 48/18 370/252 |
| 2013/0021933 A1* | 1/2013 | Kovvali | ................ | H04W 88/18 370/252 |
| 2013/0033997 A1* | 2/2013 | Cheng | .................. | H04W 76/02 370/252 |
| 2013/0065562 A1* | 3/2013 | Singh | ................. | H04L 12/1492 455/414.1 |
| 2013/0083661 A1* | 4/2013 | Gupta | ..................... | H04W 4/70 370/235 |
| 2013/0100928 A1* | 4/2013 | Matsumori | ........... | H04W 36/24 370/331 |
| 2013/0111038 A1* | 5/2013 | Girard | .................... | H04L 45/245 709/226 |
| 2013/0190026 A1* | 7/2013 | Agrawal | ............... | H04W 28/16 455/507 |
| 2013/0265917 A1 | 10/2013 | Lv et al. | | |
| 2014/0050086 A1* | 2/2014 | Himayat | ............ | H04N 21/2365 370/230 |
| 2014/0233413 A1 | 8/2014 | Dahod et al. | | |
| 2014/0308986 A1* | 10/2014 | Yang | ..................... | H04W 88/06 455/552.1 |
| 2015/0085829 A1* | 3/2015 | Bawaskar | ............. | H04W 36/30 370/332 |
| 2015/0087307 A1* | 3/2015 | Cui | ........................ | H04W 48/20 455/436 |
| 2015/0120799 A1* | 4/2015 | Jaggi | ...................... | H04L 67/14 709/201 |
| 2015/0124616 A1* | 5/2015 | Lohman | ................ | H04W 28/08 370/235 |
| 2015/0271725 A1* | 9/2015 | Lee | ........................ | H04L 67/148 455/436 |
| 2015/0312831 A1* | 10/2015 | Sang | ................. | H04W 36/0083 370/236 |
| 2015/0334773 A1* | 11/2015 | Cui | ....................... | H04W 28/16 370/328 |
| 2016/0173805 A1* | 6/2016 | Claus | .................... | H04N 17/004 348/148 |

OTHER PUBLICATIONS

International Search Report and Written Opinion for Application No. PCT/US2016/026638, dated Sep. 23, 2016.

* cited by examiner

APPLICATION INTELLIGENCE CONTROLLER

CROSS-REFERENCE TO RELATED APPLICATIONS

The present application claims priority to U.S. Provisional Patent Application No. to 62/145,339, filed Apr. 9, 2015, and incorporates its disclosure herein by reference in its entirety.

TECHNICAL FIELD

In some implementations, the current subject matter described herein generally relates to providing an application intelligence control in a communications system, such as in a long-term evolution wireless communications systems. In some implementations, the current subject matter described herein generally relates to providing port-based flow identification in wireless networks, such as in long-term evolution wireless communications systems

BACKGROUND

In today's world, cellular networks provide on-demand communications capabilities to individuals and business entities. Typically, a cellular network is wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide guaranteed bandwidth within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if when mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. LTE is based on the GSM/EDGE and UMTS/HSPA digital cellular technologies and allows for increasing capacity and speed by using a different radio interface together with core network improvements.

Modern user equipment is capable of running various software applications that relate to email, Internet browsing, productivity, management, and/or any other types of software applications. These software applications can be provided to the user equipment by a third party application server to which the user equipment can connect via a base station and a core network services. Once installed, the user equipment can use the software application for its intended purposes. The applications can consume a significant amount of data that may be passed to the user equipment from the third party service that may be hosting the application's data via the base station. Conventional systems are not capable of performing monitoring and control of the applications and data that are being consumed by a user equipment. Such monitoring and control can lead to an improved connectivity, data management, and efficient operation of the wireless networks.

SUMMARY

In some implementations, the current subject matter relates to a computer-implemented method for transmission of data packets. The method can include determining whether an application service is being consumed by a user equipment, obtaining channel quality information for a channel being used by the user equipment to consume the application service, and applying, based on the obtained channel quality information, a treatment to the application service being consumed by the user equipment. At least one of the determining, the obtaining, and the applying can be performed using at least one processor of at least one computing system.

In some implementations, the current subject matter can include one or more of the following optional features. An evolved node (eNodeB) base station can perform at least one of the determining, the obtaining and the applying. The eNodeB base station can include at least one processor and the at least one memory.

In some implementations, the determination of whether an application service is being consumed can be made based on at least one subscription preference associated with the application service. In some implementations, the method can further include transmitting at least one data packet associated with the application service and stored in the at least one memory from the base station to the user equipment.

In some implementations, the channel quality information can include at least one of the following: a quality channel indicator ("QCI"), an available bandwidth, latency, jitter, a cell load, a mobile/stationary state of the user equipment and/or any combination thereof. The method can also include performing redirection of an uplink transmission associated with the application service to a server communicatively coupled to the base station. The treatment can include at least one of the following: a prioritized delivery of a data packet associated with the application service, a reliable delivery of a data packet associated with the application service, and a redirection of a data packet associated with the application service to a predetermined tunnel.

In some implementations, the current subject matter relates to a computer-implemented method for transmission of data packets. The method can include receiving, by a first base station, a request from a user equipment for at least one data packet from a server, establishing, by the first base station, a communications session between the user equipment and the server, the communications session being associated with a session identifier, obtaining, based on a determining, at least one data packet responsive to the request from the server, determining, by the first base station, that the user equipment is being communicatively coupled to a second base station, and performing, by the first base station, handover of the user equipment from the first base station to the second base station, wherein the communication session is maintained between the user equipment and the server using the second base station subsequent to the server receiving an acknowledgement from the first base station.

In some implementations, the current subject matter can include one or more of the following optional features. The first base station and/or the second base station can be an evolved node (eNodeB) base station, where the eNodeB base station can include at least one processor and at least one memory (as discussed above). The data packet can be a cached data packet stored by the server (e.g., a cache server).

In some implementations, the session identifier can be determined based on a port number of the first base station. The session identifier can be mapped to an internet protocol address of the user equipment based on at least one data packet received from the user equipment and the mapping can be stored by the server. Further, the session identifier can be mapped to the internet protocol address of the user equipment based on an internet protocol header of the data packet (e.g., last data packet) received from the user equipment. The internet protocol address of the user equipment can be a network address translated internet protocol address.

In some implementations, the communication session can be a transmission control protocol ("TCP") session.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein. Additionally, computer systems may include additional specialized processing units that are able to apply a single instruction to multiple data points in parallel.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWING

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

DETAILED DESCRIPTION

To address the deficiencies of currently available solutions, one or more implementations of the current subject matter relate to an application intelligence controller. The application intelligence controller can be implemented in a base station (e.g., an eNodeB) and can be used to perform a determination as to whether an application service (e.g., a third party application) is being consumed by a user equipment (e.g., a mobile device). Once such determination is made, the application intelligence controller can request channel quality information for a channel being used by the user equipment to consume the application service. Subsequently, the controller can apply treatment to the application service based on the received channel quality information. Further, in some implementations, the current subject matter can provide port-based flow identification in wireless networks. In some implementations, the current subject matter can be implemented in a wireless communication system, such as a long-term evolution system, where some of its components are discussed below.

I. Long Term Evolution Communications System

FIGS. 1a-c and 2 illustrate an exemplary conventional long term evolution ("LTE") communication system 100 along with its various components. An LTE system or a 4G LTE, as it commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard is developed by the 3GPP ("3rd Generation Partnership Project").

Figure 1A:
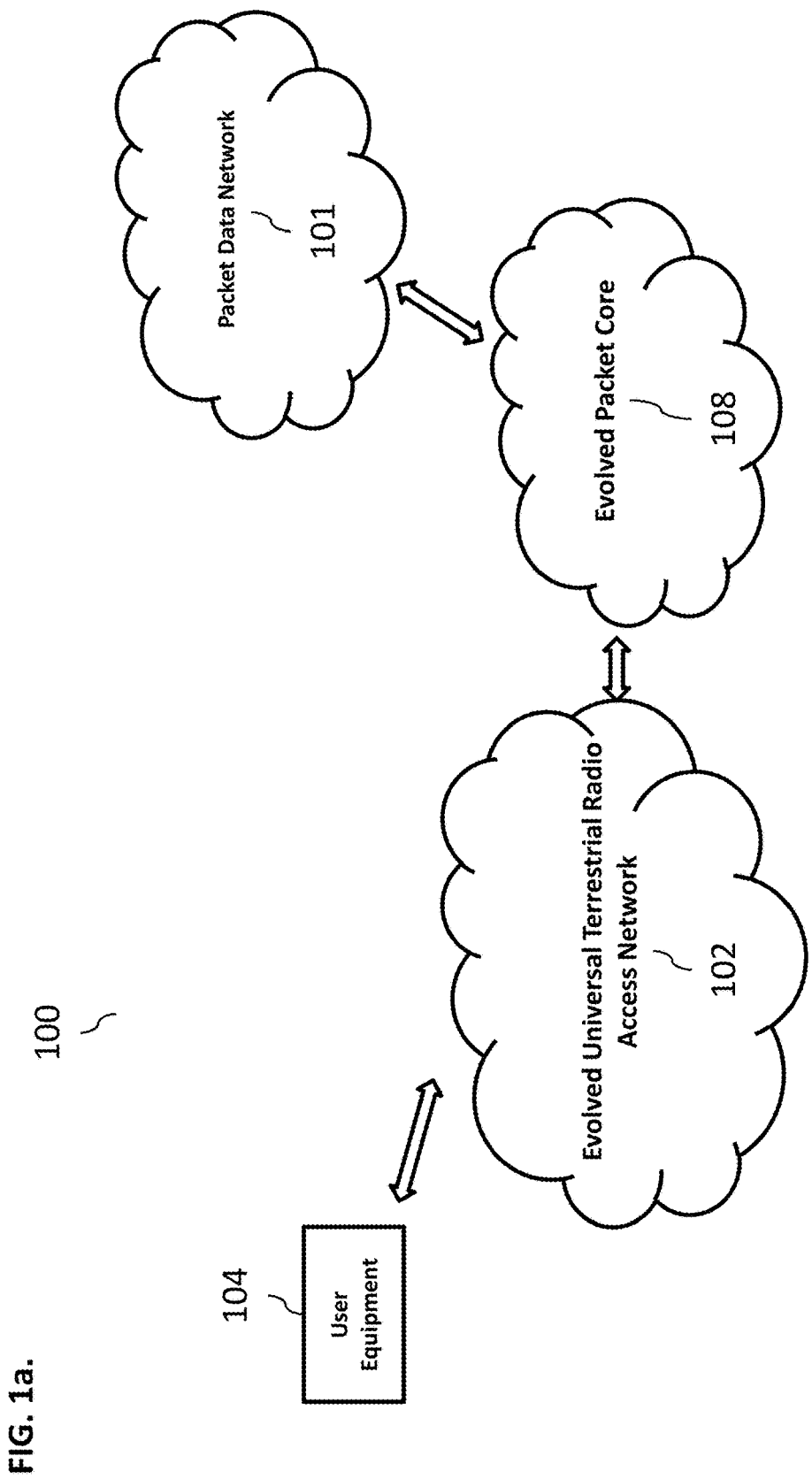
FIG. 1a illustrates an exemplary conventional long term evolution ("LTE") communications system.
Figure 1B:
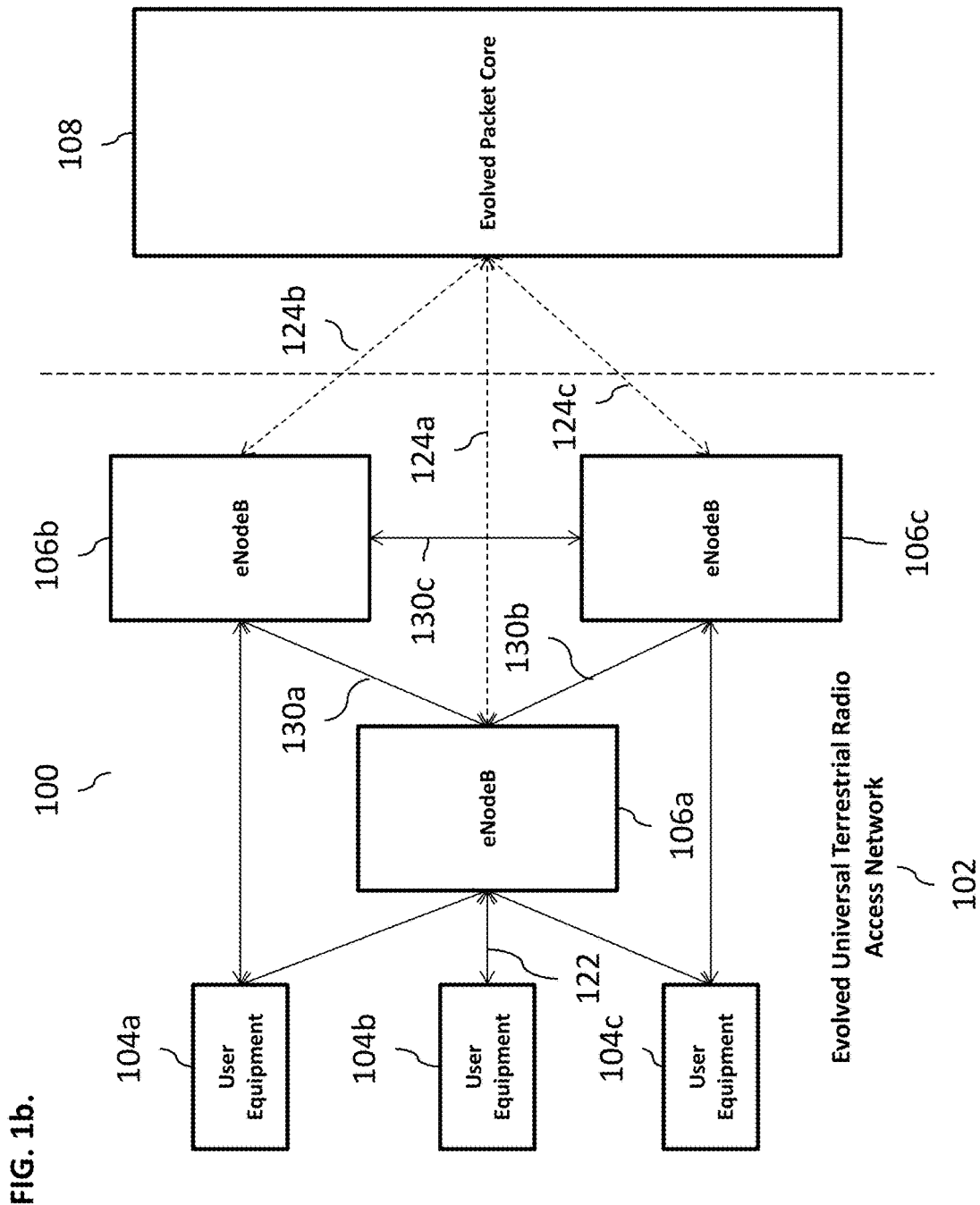

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a table, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
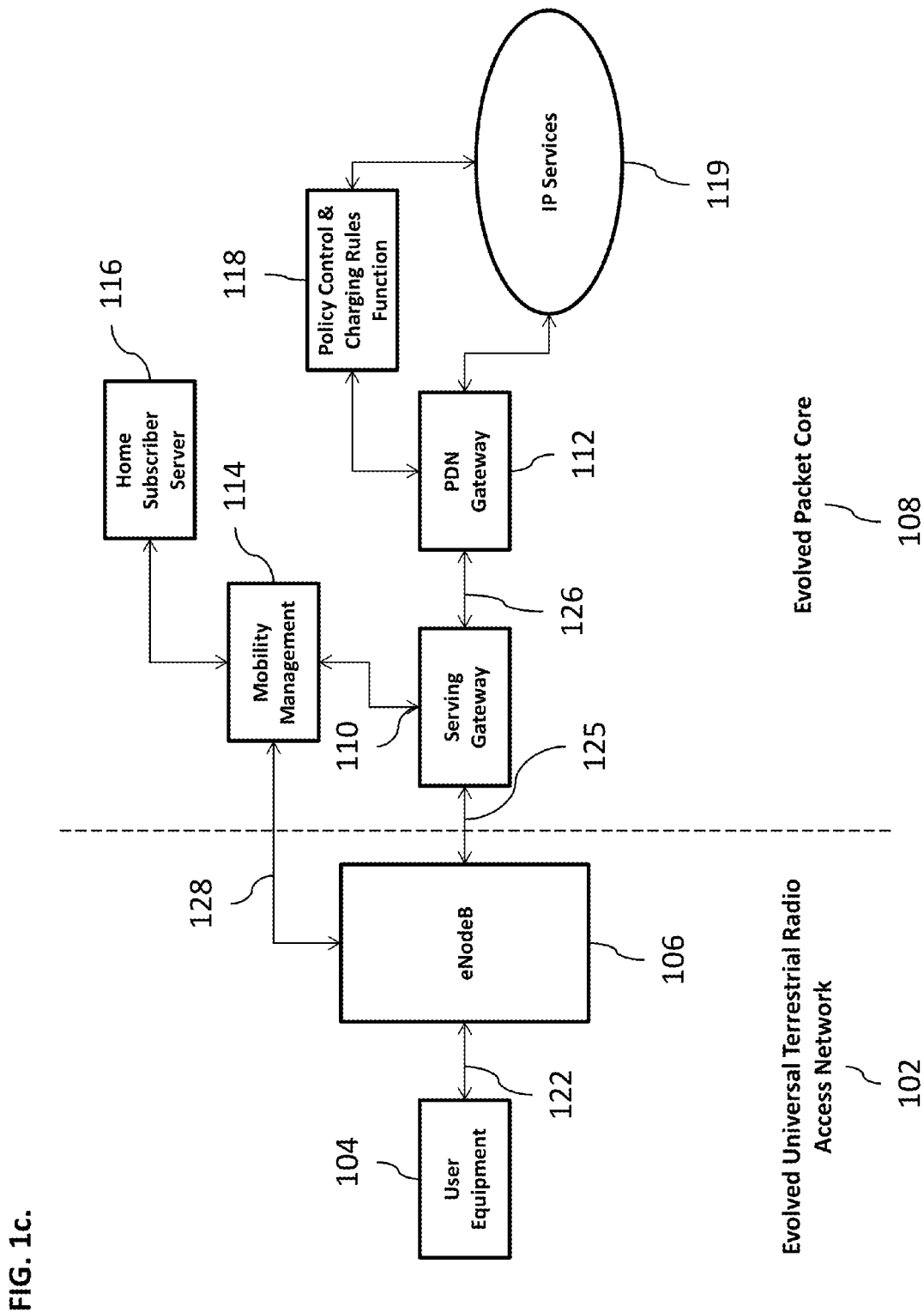

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMES in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1*a*).

II. eNodeB

Figure 1D:
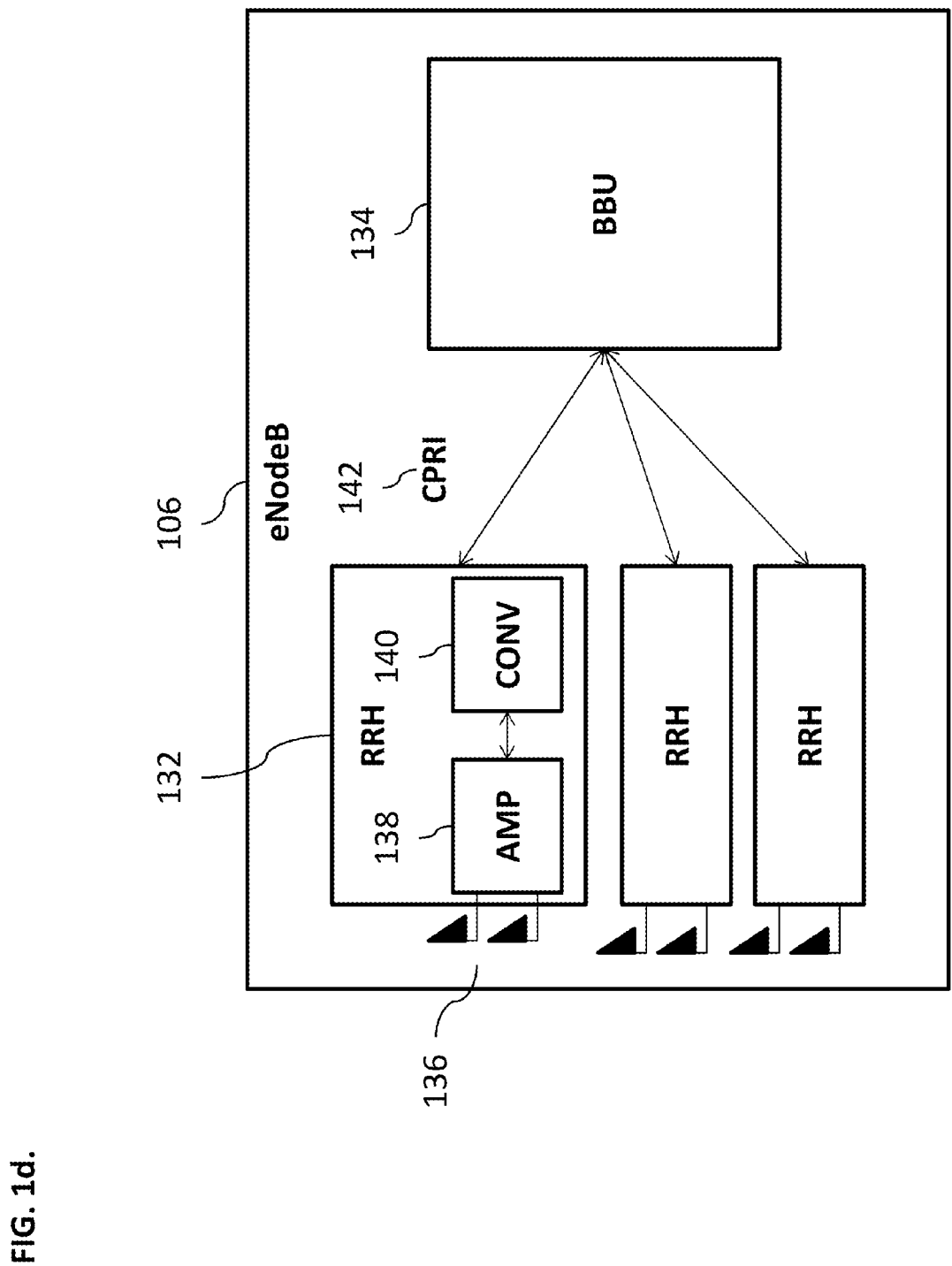

FIG. 1*d* illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI") 142 standard specification. The operation of the eNodeB 106 can be characterized using the following standard parameters (and specifications): radio frequency band (Band4, Band9, Band17), bandwidth (5, 10, 15, 20 MHz), access scheme (downlink: OFDMA; uplink: SC-OFDMA), antenna technology (downlink: 2×2 MIMO; uplink: 1×2 single input multiple output ("SIMO")), number of sectors (6 maximum), maximum transmission power (60 W), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

Figure 2:
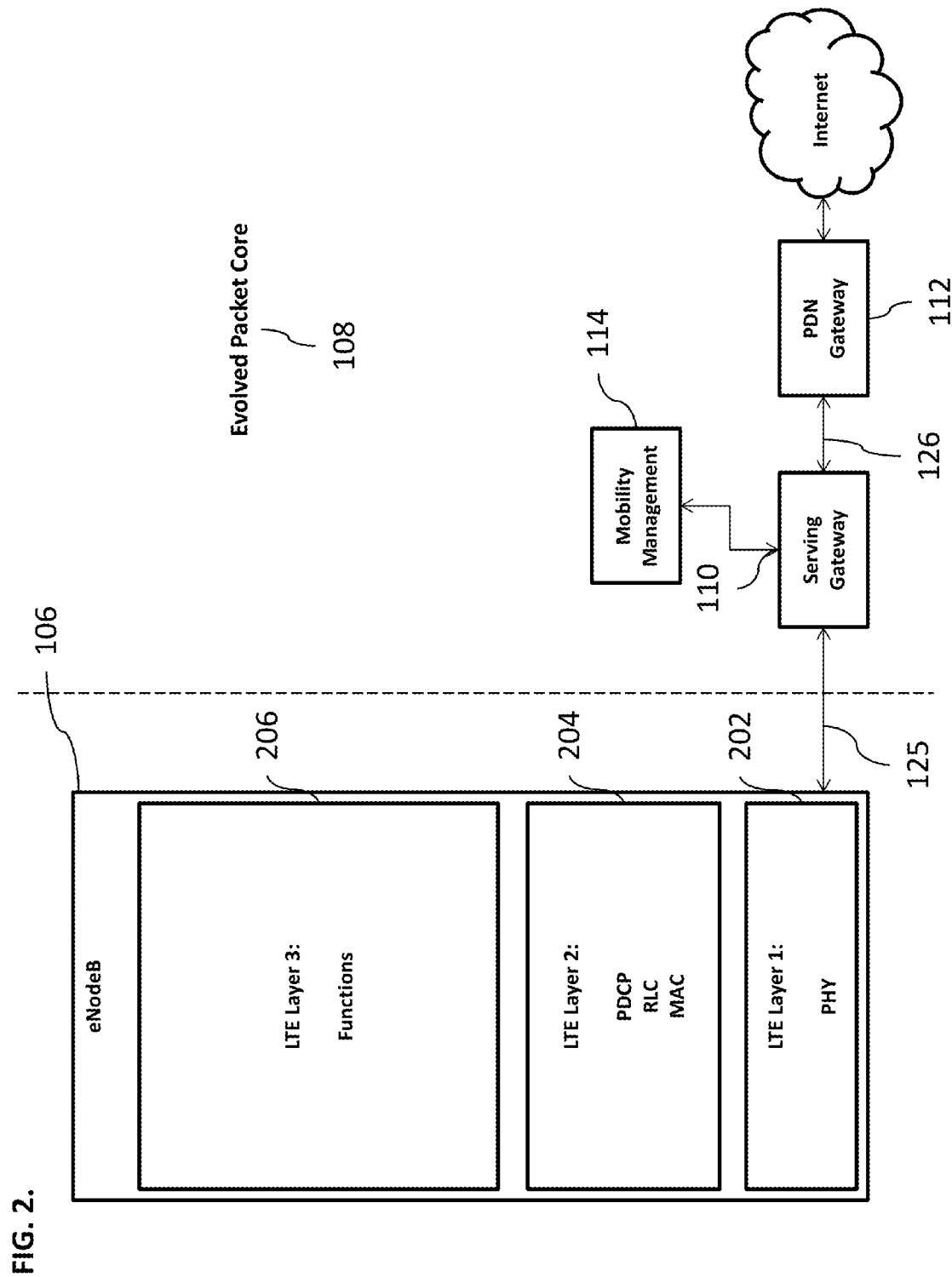
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

III. Intelligent LTE Radio Access Network

Figure 3:
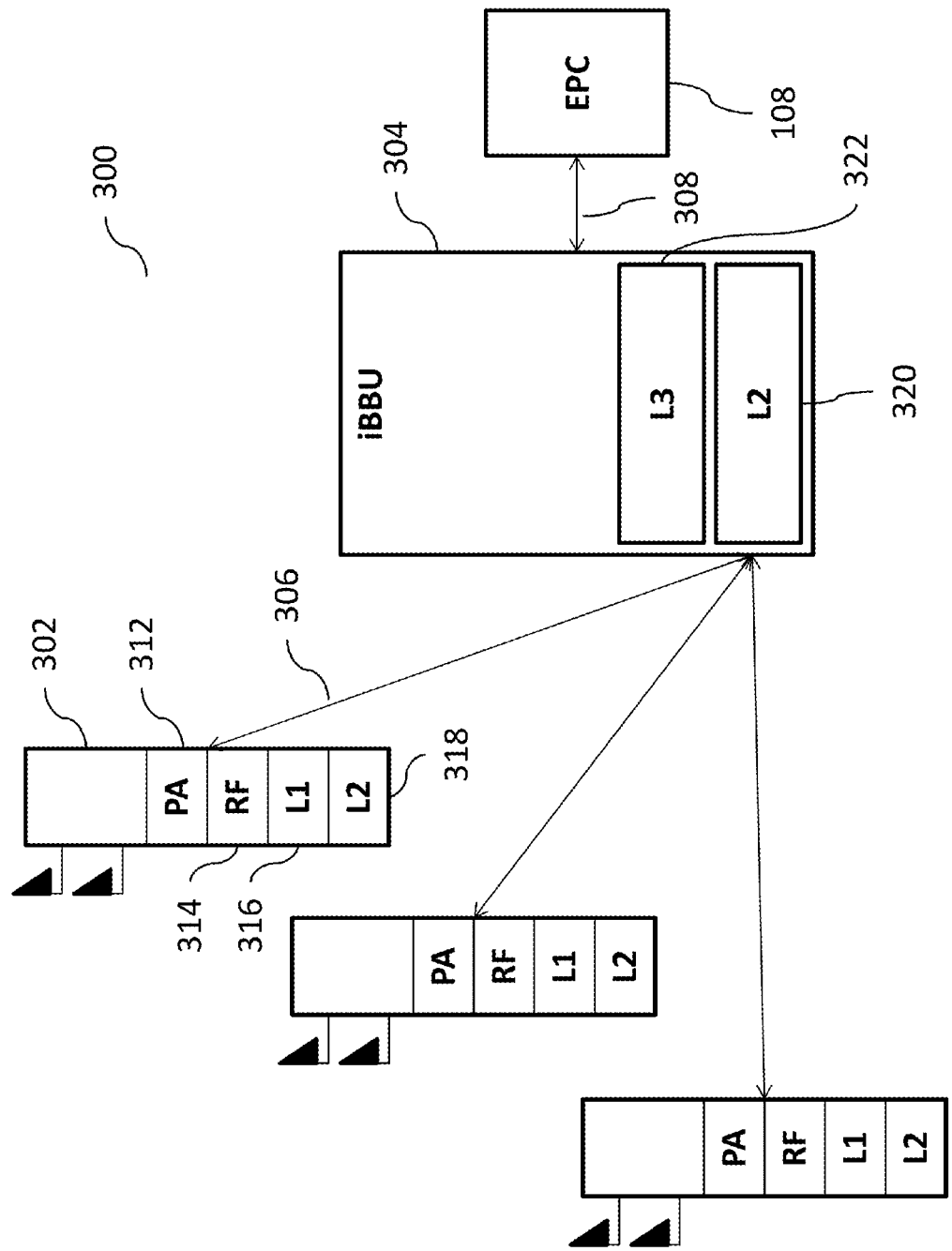
FIG. 3 illustrates an exemplary intelligent Long Term Evolution Radio Access Network, according to some implementations of the current subject matter.

FIG. 3 illustrates an exemplary system 300, according to some implementations of the current subject matter. The system 300 can be implemented as a centralized cloud radio access network ("C-RAN"). The system 300 can include at least one intelligent remote radio head ("iRRH") unit 302 and an intelligent baseband unit ("iBBU) 304. The iRRH 302 and iBBU 304 can be connected using Ethernet fronthaul ("FH") communication 306 and the iBBU 304 can be connected to the EPC 108 using backhaul ("BH") communication 308. The user equipment 104 (not shown in FIG. 3) can communicate with the iRRH 302.

In some implementations, the iRRH 302 can include the power amplifier ("PA") module 312, the radio frequency ("RF") module 314, LTE layer L1 (or PHY layer) 316, and a portion 318 of the LTE layer L2. The portion 318 of the LTE layer L2 can include the MAC layer and can further include some functionalities/protocols associated with RLC and PDCP, as will be discussed below. The iBBU 304 can be a centralized unit that can communicate with a plurality of iRRH and can include LTE layer L3 322 (e.g., RRC, RRM, etc.) and can also include a portion 320 of the LTE layer L2. Similar to portion 318, the portion 320 can include various functionalities/protocols associated with RLC and PDCP. Thus, the system 300 can be configured to split functionalities/protocols associated with RLC and PDCP between iRRH 302 and the iBBU 304.

IV. Application Intelligence Controller

Figure 4:
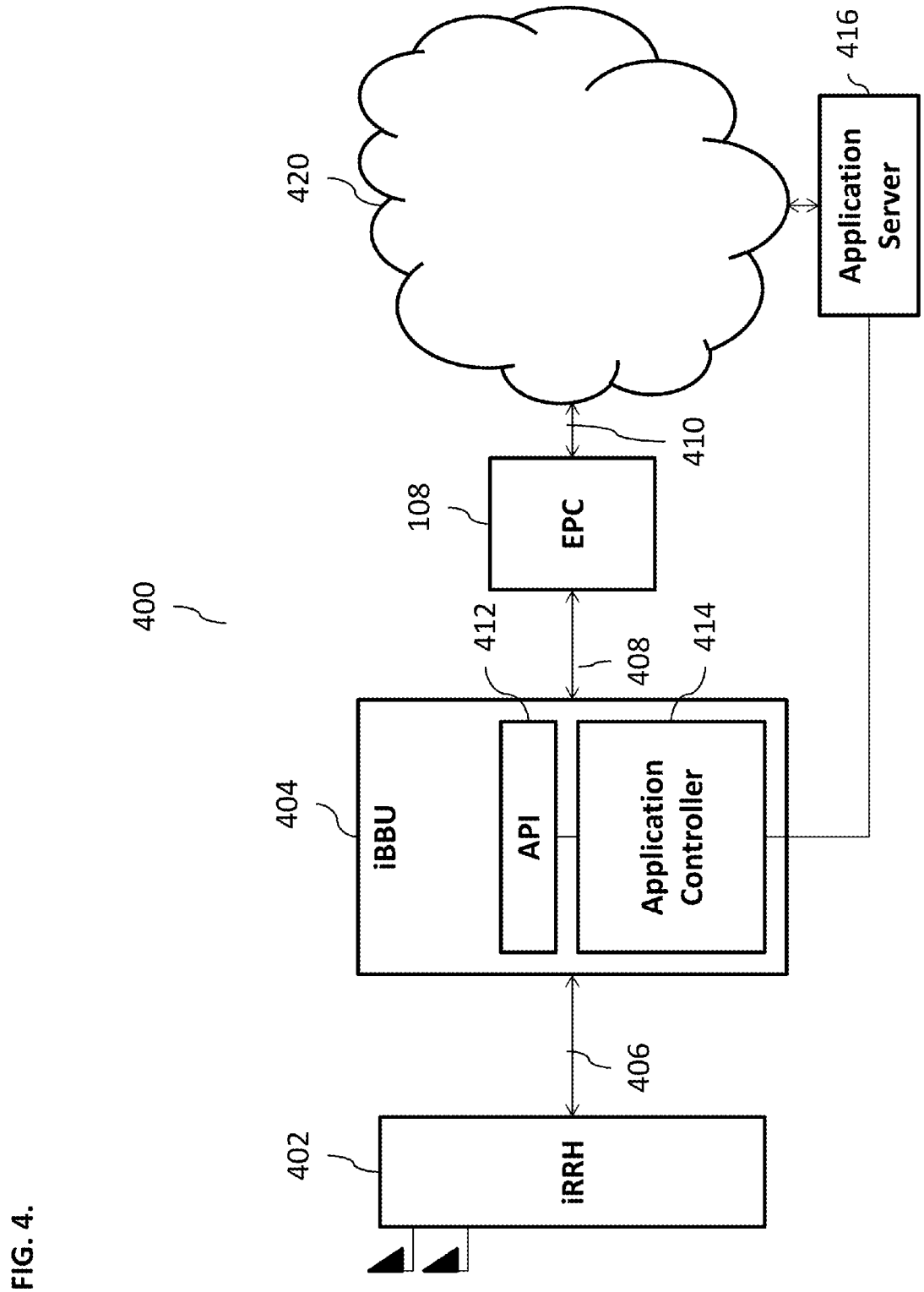
FIG. 4 illustrates an exemplary system for performing an intelligent application control, according to some implementations of the current subject matter.

FIG. 4 illustrates an exemplary system 400 for performing an intelligent application control, according to some implementations of the current subject matter. The system 400 can include an intelligent remote radio head ("iRRH") 402 communicatively coupled with an intelligent baseband unit ("iBBU") 404 via a fronthaul communication link 406 (which are similar to the like components shown in FIG. 3. The iBBU 404 can be communicatively coupled with an evolved packet core 108 (similar to the EPC 108 shown in FIG. 1), which can be coupled to the network 420. The network 420 can be any type of network (e.g., MAN, WAN, LAN, internet, intranet, extranet, etc.) The iBBU 404 and the EPC 108 can be connected via an S1 communication link 408 and the EPC 108 can be connected to the network 420 via communication link 410.

In some implementations, an application server 416 can be communicatively coupled to the network 420 and the iBBU 404. Alternatively, the application server 416 can be part of the network 420. In some implementations, the application server 416 can be co-located with the iBBU 404. The application server 416 can include hardware, software, and/or any combination of hardware and/or software. It can also include and/or otherwise be coupled to devices capable of providing processing and/or storage of various software applications. The application server 416 can provide user equipment(s) (not shown in FIG. 4) with a variety of applications that the user equipment(s) can use (e.g., email, internet browsers, video, shopping services, etc.). The applications can be hosted on the server 416 and/or can be supplied by third parties to the server 416. The server 416 can provide such applications to user equipment(s) upon request (either from the user and/or the iBBU 404) and/or automatically.

The application server 416 can interact with the user equipment(s) using an application controller 414 that can be included in the iBBU 404. The application controller 414 can be software, hardware and/or any combination of software and/or hardware. The application controller 414 can interact with various components of the iBBU 404 using an application programming interface ("API") 412. Through this interaction, the application controller 414 can acquire intelligence on the user equipment(s), iBBU load, delay information, etc. Additionally, the application controller 414 can also provide the iBBU 404 with policies to manage application service flows from the application server 416.

Figure 5:
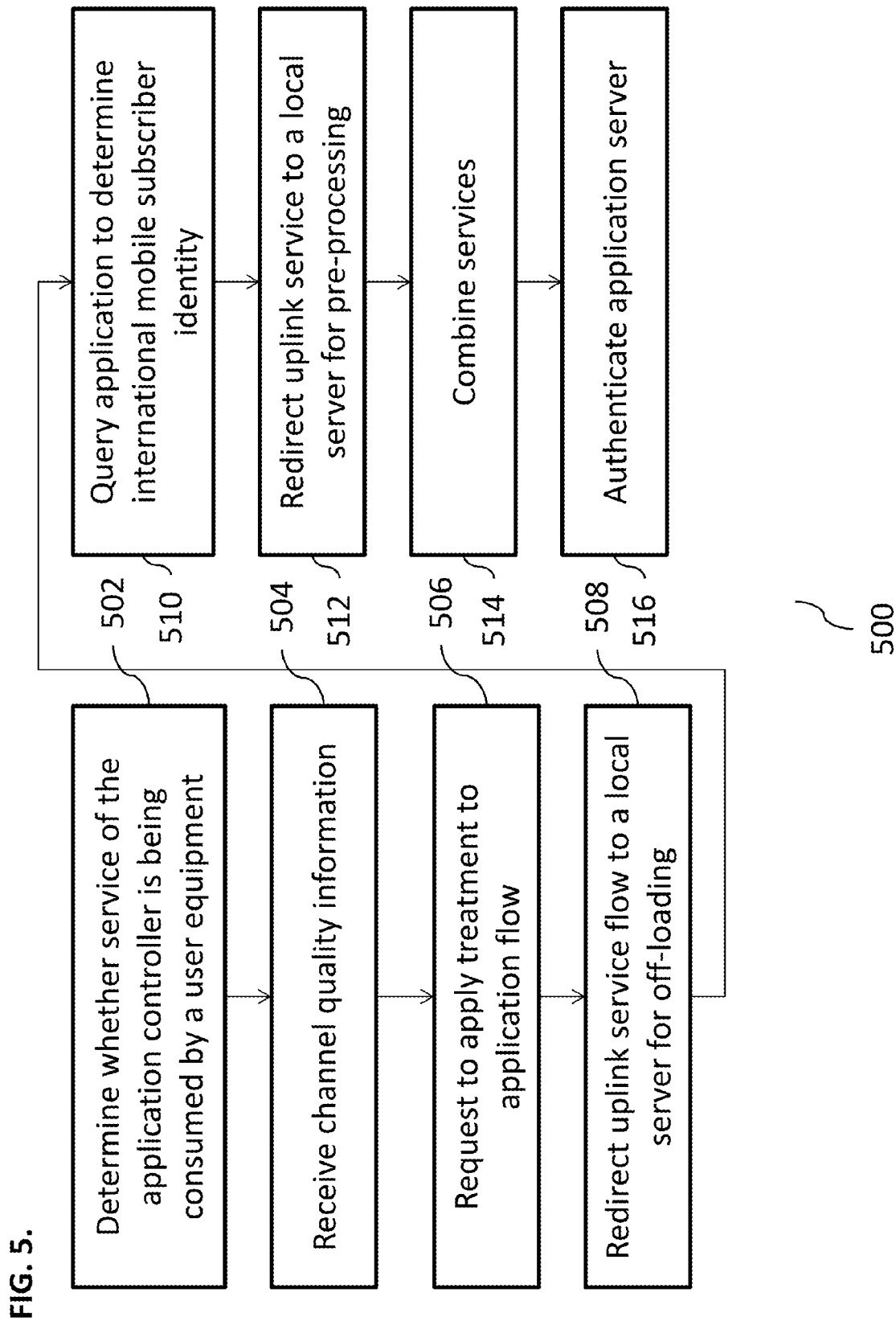
FIG. 5 illustrates an exemplary process for performing an intelligent application control, according to some implementations of the current subject matter.

FIG. 5 illustrates an exemplary process 500 for performing an intelligent application control, according to some implementations of the current subject matter. The process 500 can be performed by the system 400 shown in FIG. 4. At 502, the controller 414 can determine whether its application service is being consumed and/or used by a user equipment that is communicating with the iBBU 404. In some implementations, the controller 414 can issue a request to the iBBU 404 through the API 412 to provide the information as to the usage of the application. Alternatively, the controller 414 can subscribe to receive notifications of events from the iBBU 404. The notifications can be based on the identification of service flows that are pertinent to specific applications. In some implementations, the controller 414 can be notified when the user equipment has terminated use of the application service and/or may have moved to another cell (i.e., another eNodeB).

In some implementations, to subscribe to event notification, the application controller 414 can issue a subscription request to the iBBU 404 through the API 412. Once the subscription request is approved, the controller 414 can begin receiving notifications when a user equipment begins consuming a particular application service flow (e.g., data packets associated with an application) being controlled by the application controller 414. The notifications can include a flow identifier that can include an internet protocol ("IP") address, device port number, protocol (UDP, TCP, etc.), SAE-Temporary Mobile Subscriber Identity ("S-TMSI"), etc. when they are detected by the iBBU 404.

At 504, the application controller 414 can also request and receive channel quality information for the channel on which the user equipment is communicating with the iBBU 404. This can be accomplished through the application controller's 414 subscribing to receive such channel quality information. The channel quality information can include quality channel indicator ("QCI"), available bandwidth, latency, jitter, cell load, mobile/stationary state of a user equipment, and/or any other information. Based on the received channel quality information, the channel controller 414 can determine how to adapt delivery of service flow to the user equipment that relates to the application being consumed by the user equipment. In some implementations, the channel quality information can be provided as part of the initial event notification, periodically, based on a threshold-triggered event, and/or based on any other factors.

In some implementations, the usage of the application by the user equipment can be conditional based on various factors. These factors can include cell loading condition, channel quality, user equipment information, and/or any other factors. The application controller 414 can setup a specific policy based on which consumption of service flows occurs for a group of user equipments and/or all user equipments that communicate with the iBBU 404, as opposed to doing individually for each user equipment. Alternatively, the application controller can setup individual policies for each user equipment communicating with the iBBU 404.

In some implementations, to subscribe to the notifications of consumption of services, the message of 'Subscribe_Request' can be used with responses including 'Acknowledge' and 'Not Acknowledge'. Using these messages, application controller 414 can subscribe to the iBBU 404 for receiving notifications when an application is being consumed by a user equipment. Further, the application controller 414 can also subscribe to the iBBU 404 to receive notifications regarding users channel quality, cell load changes, as well as any other information.

Additionally, an 'Information_Request' message can be used by the application controller 414 to request from iBBU 404 information related to channel quality, available bandwidth, latency, jitter, cell load, mobile/stationary state of a user equipment, and/or any other information. A response to this message can include 'Acknowledge' and 'Not Acknowledge'.

Further, as part of the subscription request, the application controller 414 can provide the following exemplary configuration information to the iBBU 404: end point details (e.g., IP address, port, protocol (TCP, UDP, etc.)), mode (e.g., mirrored, redirected, etc.), filters (e.g., traffic to be redirected to application controller (in redirect mode)), as well as any other information. For example, the configuration information can include: TCP Port 80, http content-type: "video" and server IP Address: "XXX".

At 506, the application controller 414 can request the iBBU 404 to apply a specific treatment of a particular service flow. Such request of application of the service flow can be based on an identification of a particular user equipment, specific service flow, etc. Additionally, the application controller 414 can request application of a particular treatment based on a specific treatment that may be requested (either by the iBBU 404, the application server 416, the user equipment, and/or any other entity). In some implementations, the treatment can include a prioritized delivery of data packets, a reliable delivery of data packets, redirection of flow of data packets to a specified tunnel, and/or any other treatment options.

In some implementations, 'Flow_Treatment_Request' message can be used by the application controller to request the iBBU 404 to apply a particular treatment of an application flow. The response to the message can include 'Acknowledge' and 'Not Acknowledge', which can indicate whether or not the request has been received or not received and whether the requested treatment will be applied.

At 508, the application being consumed by the user equipment that can request redirection of an uplink service flow to a local server for off-loading. To redirect flow of an application data packets to a local server (e.g., for the purposes of aggregation, pre-processing and/or off-loading), a tunnel can be established between the iBBU 404 and the application controller 414 to forward and receive application flows. Then, a local server can loop back the application flow to the iBBU 404 for forwarding uplink data packets to the network 420. The local server can also respond to uplink requests directly and send downlink responses directly to the user equipment using the iBBU 404 on a local tunnel.

At 510, the iBBU 404 can query the application to determine an international mobile subscriber identity ("IMSI") of the user equipment based on available identification information (e.g., SAE-Temporary Mobile Subscriber Identity ("S-TMSI"), internet protocol ("IP") address, S1 Mobility Management Entity ("S1-MME") identifier, etc.).

At 512, the application being consumed by the user equipment can request redirection of an uplink service flow to a local server for pre-processing before sending further upstream directly by the application controller 414 or looping it back through the iBBU 404.

In some implementations, application service flows and/or any other service flows can be combined together, at 514. For example, user equipment data can be first passed through an application, such as firewall services and once the user equipment data passed through, other data, e.g., image/video processing data, can be forwarded. Once the above processing is completed, application server 416 can be authenticated by the iBBU 404 to be authorized to use services provided by the iBBU 404.

In some implementations, the following protocol message can be used to perform various functions. For the purposes of authenticating and/or authorizing the application server 416 to use services provided by the iBBU 404, a messages of 'Service_Authentication_Request' can be used. A response can include 'Acknowledge' or 'Not Acknowledge'.

In some implementations, 'Subscriber_Context_Creation' and 'Subscriber_Context_Termination' messages can be used to create context and terminate context creation, respectively. The iBBU 404 can respond by acknowledging and/or not acknowledging such requests. A 'Tunnel_Establishment_Request' message can be used to establish a local tunnel when redirection of an application flow is requested.

Figure 6:
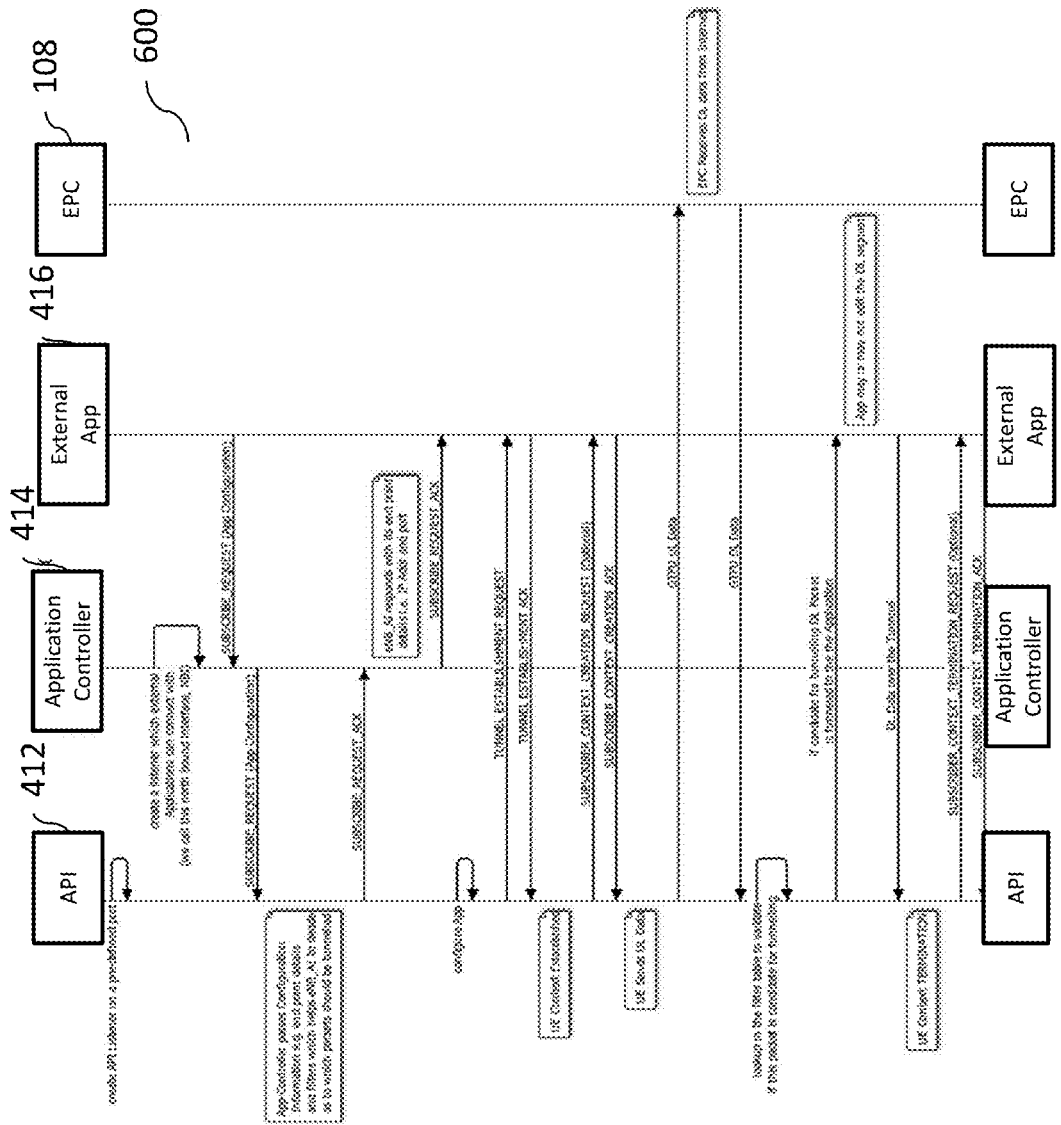
FIG. 6 illustrates an exemplary redirected mode of operation of an application controller, according to some implementations of the current subject matter.

FIG. 6 illustrates an exemplary redirected mode 600 of operation of an application controller 414, according to some implementations of the current subject matter. In the mode 600, the control of the data packet flow can be redirected to the application controller 414. During the operation mode 600, the external application 416 (e.g., from the external server 416) can create a subscribe request ('SUBSCRIBE_REQUEST'), which can include application configuration information, e.g., endpoint details, and forward it to the application controller 414, which can forward it to the API 412. The application controller 414 can also create a listener with which external applications can connect. Further, the application controller 414 can pass configuration information, including end point details and filters which can allow the API 412 to determine which data packets can be tunneled. The API 412 can generate an acknowledgement ('SUBSCRIBE_REQUEST_ACK') and send it back to the application controller 414, which can pass it along to the external application 416. The API 412 can also respond with endpoint details, e.g., IP address, port information, etc. Once the application service flow is configured, the API 412 can send a tunnel establishment request ('TUNNEL_ESTABLISHMENT_REQUEST') message to the external application 416 via the application controller 414 and the external application 416 can respond via controller 414 with an acknowledgement ('TUNNEL_ESTABLISHMENT_ACK').

When the tunnel is established, the user equipment's context can be established. An optional sub scriber context creation request ('SUBSCRIBER_CONTEXT_CREATION_REQUEST') message can be sent to the external application 416 via the application controller 414, and the external application 416 can respond with an acknowledgement ('SUBSCRIBER_CONTEXT_CREATION_ACK') via the application controller 414 to the API 412. At this point, the user equipment can send uplink data to the iBBU 404 (not shown in FIG. 6) and the uplink packet can be tunneled to the application controller 414.

The API 412 can process the uplink data packet received from the controller 414 and send it to the EPC 108 (in the form of GTPU UL data). The EPC 108 then receives a downlink packet from the network 420 (not shown in FIG. 6) and sends it to the API 412 (in the form of the GTPU DL data). The API 412 can perform a lookup in the filter table to validate if the received data packet is a candidate for tunneling. If the data packet is a candidate, the API 412 can then redirect the downlink data over the established tunnel to external application 416 via the application controller 414, which the application 416 can choose to edit. The external application 416 can then send via the controller 414 the downlink data back to the API 412 over the established tunnel. At this point, the subscriber context termination messages can be exchanged between the API 412 and the external application 416 via the controller 414 (i.e., 'SUBSCRIBER_CONTEXT_TERMINATION_REQUEST' and 'SUBSCRIBER_CONTEXT_TERMINATION_ACK').

Figure 7:
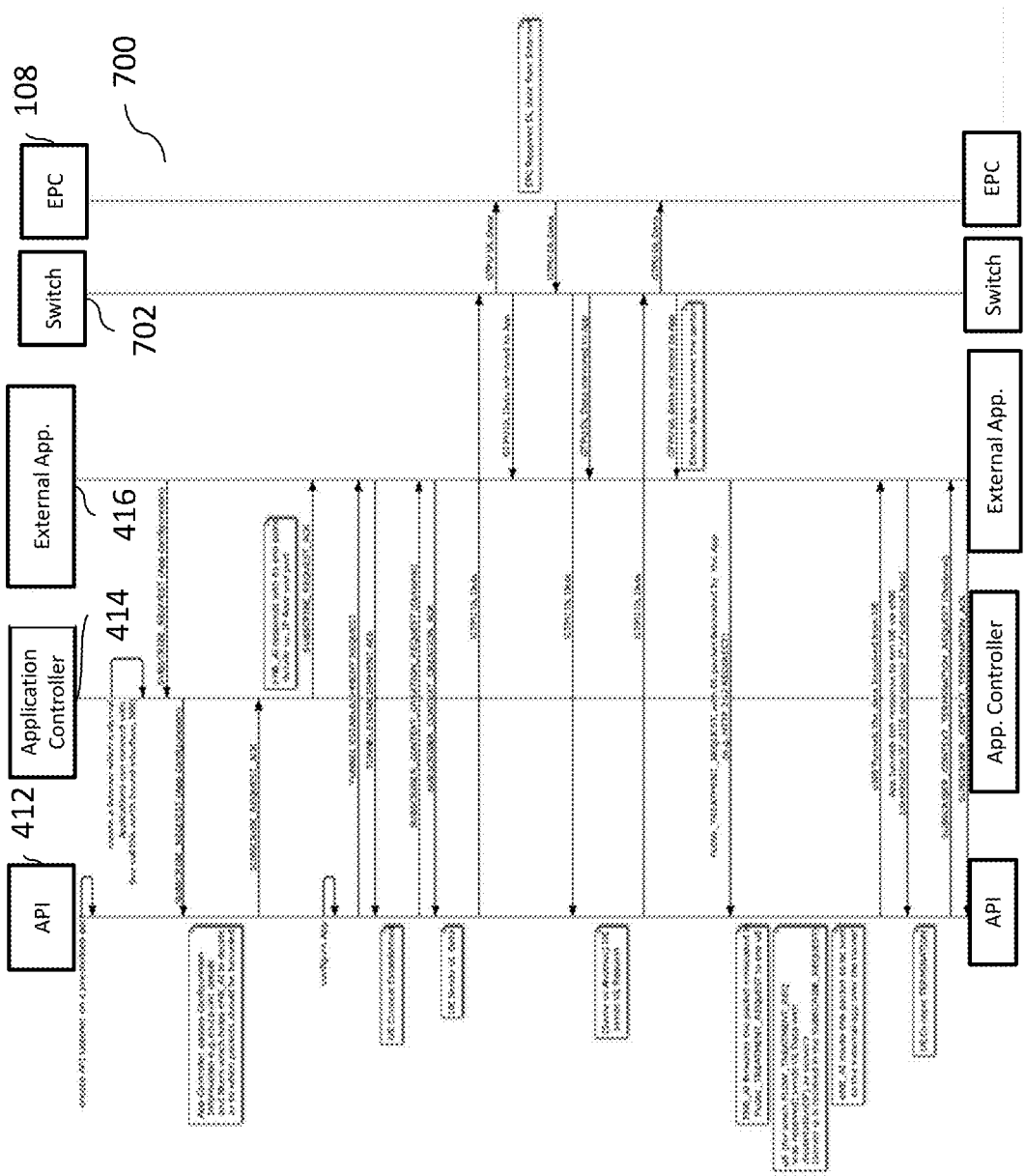
FIG. 7 illustrates an exemplary mirrored mode of operation of an application controller, according to some implementations of the current subject matter.

FIG. 7 illustrates an exemplary mirrored mode 700 of operation of an application controller 414, according to some implementations of the current subject matter. The mode 700 is similar to the mode 600 shown in FIG. 6, however, it includes a switch component 702 that can perform mirroring of uplink/downlink data flows between the application controller and the EPC 108. As shown in FIG. 7, the control of the data packet flow can be mirrored between the application controller 404 and EPC 108.

During the operation mode 700, the API 412 can create a listener on a pre-defined port. The application controller 414 can also create a listener with which external applications can connect. Further, the application controller 414 can pass configuration information, including end point details and filters which can allow the API 412 to determine which data packets can be tunneled. The API 412 can generate an acknowledgement ('SUBSCRIBE_REQUEST_ACK') and send it back to the application controller 414, which can pass it along to the external application 416. The API 412 can also respond with endpoint details, e.g., IP address, port information, etc. Once the application service flow is configured, the API 412 can send a tunnel establishment request ('TUNNEL_ESTABLISHMENT_REQUEST') message to the external application 416 via the application controller 414 and the external application 416 can respond via controller 414 with an acknowledgement ('TUNNEL_ESTABLISHMENT_ACK').

When the tunnel is established, the user equipment's context can be established. An optional sub scriber context creation request ('SUBSCRIBER_CONTEXT_CREATION_REQUEST') message can be sent to the external application 416 via the application controller 414, and the external application 416 can respond with an acknowledgement ('SUBSCRIBER_CONTEXT_CREATION_ACK') via the application controller 414 to the API 412. At this point, the user equipment can send uplink data to the iBBU 404 (not shown in FIG. 7) and the uplink packet can be tunneled to the application controller 414.

At this point, the user equipment can send uplink data packets to the API 412. The API 412 can process the uplink data packet received from the user equipment and send it to the switch 702 (in the form of GTPU UL data). The switch 702 can then forward this data to the EPC 108 and a mirror of this data to the external application 416. The EPC 108 then receives a downlink packet from the network 420 (not shown in FIG. 7) and sends it to the switch 702 (in the form of the GTPU DL data). The switch 702 can send this data to the API 412 and a mirror of this data to the external application 416. If additional or same uplink data packets are received from the user equipment, further GTPU UL data can be sent to the switch 702, which can forward it to the EPC 108. The switch 702 can also send a mirror of the GTPU UL data to the external application 416.

At this point, the external application 416 can forward a flow treatment request ('FLOW_TREATMENT_REQUEST') message to the API 412. The API 412 can forward the packet embedded in this message to the user equipment (e.g., in the form of a HTTP 302 request). In response, the user equipment can send uplink data packets with destination internet protocol address of the application controller 414. The API 412 can mark the packet for sending it over the established tunnel. The API 412 can then forward this data (that was received from the user equipment) over the established tunnel to the external application 416. The application 416 can then send a response to the user equipment via the application controller 414 and the API 412 over the established tunnel (e.g., which can include a destination internet protocol address of the user equipment and internet protocol address of the application 416). After these operations, the subscriber context termination messages can be exchanged between the API 412 and the application 416 (i.e., 'SUBSCRIBER_CONTEXT_TERMINATION_REQUEST' and 'SUBSCRIBER_CONTEXT_TERMINATION_ACK').

V. Caching Data and User Equipment Handoff

Figure 8:
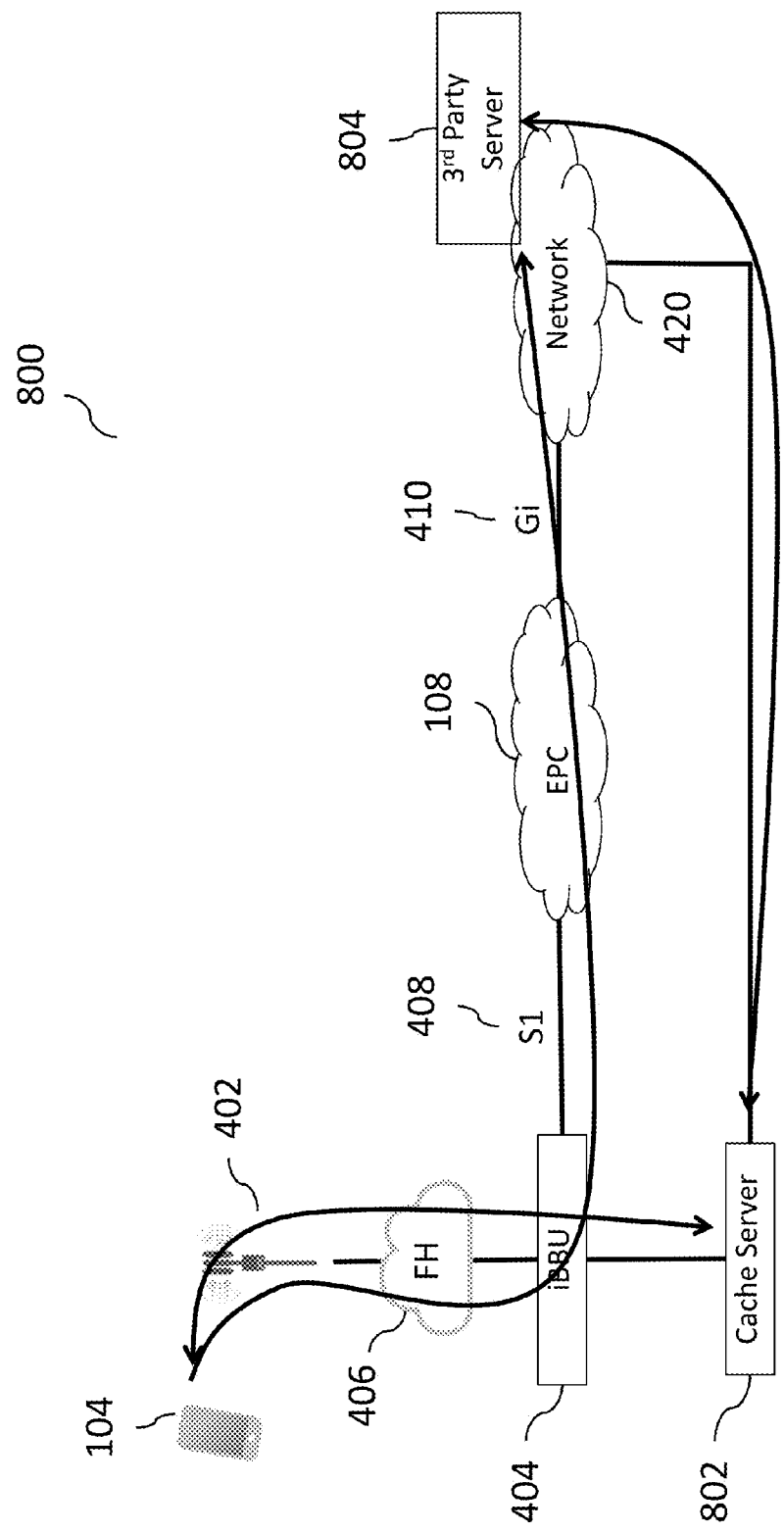
FIG. 8 illustrates an exemplary system for caching data at or near an eNodeB, according to some implementations of the current subject matter.

FIG. 8 illustrates an exemplary system 800 for caching data at or near the iBBU 404, according to some implementations of the current subject matter. The iBBU 404 can be communicatively coupled to an iRRH 402 via a fronthaul connection 406 and via an S1 link 408 to the evolved packet core 108, which is communicatively coupled to a network 420 via connection (e.g., Gi LAN) 410. The exemplary system 800 can be a variation of the exemplary system 400 as shown in FIG. 4. The system 800 can include a cache server 802 being communicatively coupled (e.g., directly and/or indirectly) with iBBU 404 for caching data to be accessed by the user equipment 104 at or near the iBBU 404. In some implementations, cache server 802 can be communicatively coupled to the network 420 and the iBBU 404. In some implementations, the cache server 802 can be co-located with the iBBU 404. The cache server 802 can include hardware, software, and/or any combination of hardware and/or software. It can also include and/or otherwise be coupled to devices capable of providing processing and/or storage of various software applications. The cache server 802 can provide user equipment(s) 104 with a variety of data types that the user equipment(s) 104 can use (e.g., email, internet browsers, audio, video, etc.). In one exemplary implementation, the cache server 802 can store third party video data that the user equipment 104 is attempting to stream. The cache server 802 can provide such applications to user equipment(s) 104 upon request (either from the user and/or the iBBU 404) and/or automatically.

The user equipment 104 can request data, such as a video, from a third party server 804 residing on network 420. Cache server 802 can receive and cache and/or store the requested data from the third party server 804. Cache server 802 can redirect user equipment 104 to the cached content by requesting user equipment 104 to establish a transmission control protocol ("TCP") session with the cache server on a particular IP and port number. This can include cache server 802 assigning an internet protocol ("IP") and port number for a given user equipment 104. In addition, the user equipment IP address as seen by the cache server 802 can be a private IP address.

Figure 9:
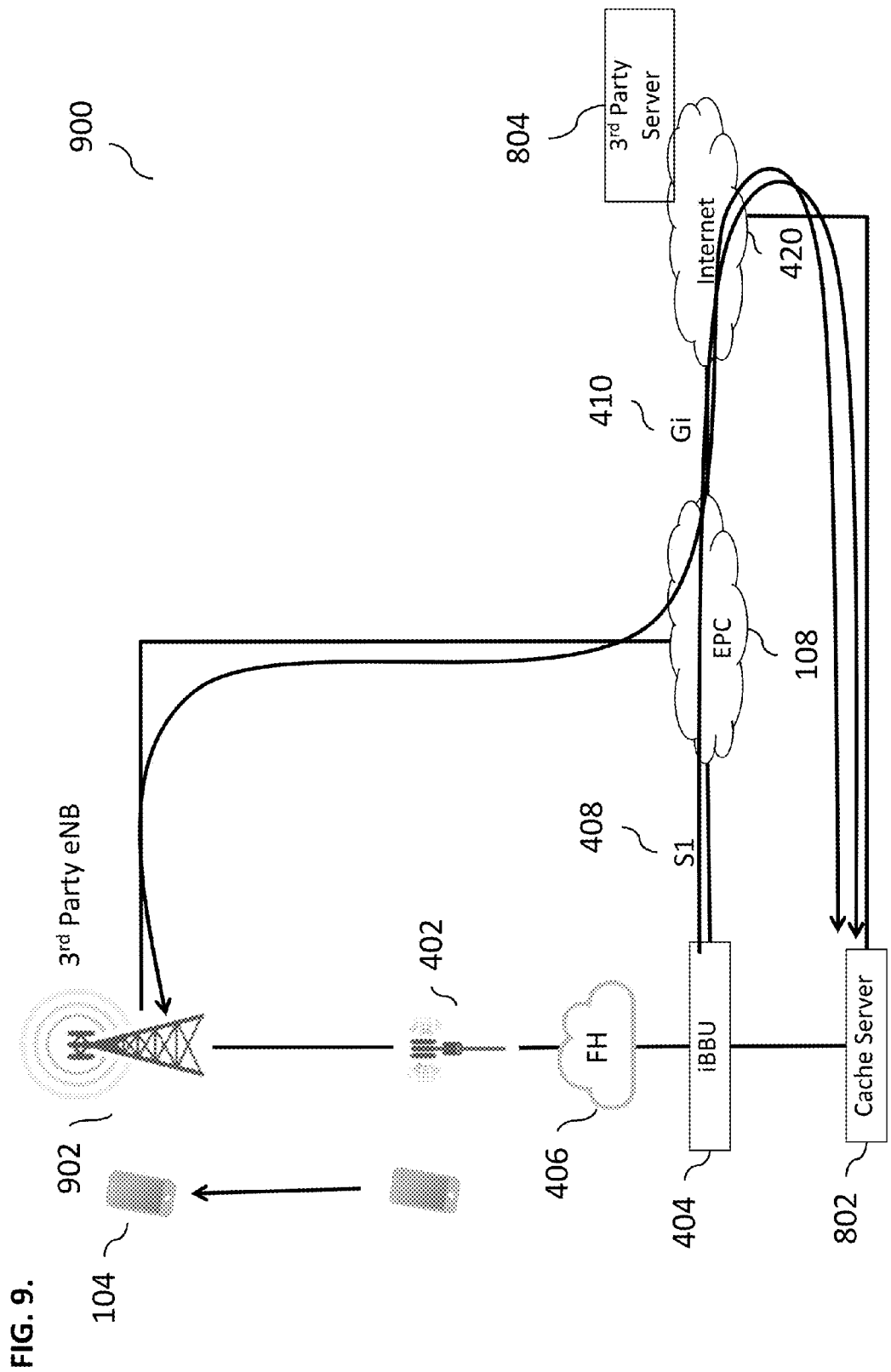
FIG. 9 illustrates an exemplary system (having complements of the system shown in FIG. 8) in which a user equipment can be handed-off to a third party eNodeB, according to some implementations of the current subject matter.

An issue can arise when user equipment 104 moves out of the coverage area associated with iBBU 404 and into a 3rd party eNodeB coverage area, which does not support local caching. FIG. 9 illustrates an exemplary system 900 (having complements of the system 800 as shown in FIG. 8) in which the user equipment 104 can be handed-off to a third party eNodeB 902, according to some implementations of the current subject matter. The cache server 802 can be required to send the cached data over the network 420 (e.g., the internet) onto the communication link 410 (e.g., a Gi LAN) and EPC 108 to reach the user equipment 104 connected to the third party eNodeB 902. TCP ACK/NACK's (negative acknowledgement) from the user equipment 104 now can arrive to the cache server 802 from the network 420. The user equipment 104 IP address as seen by the cache server 802 is a network address translated ("NATed") IP address, which can be typically NATed at the PDN Gateway and/or a firewall.

Under these conditions, it can be challenging for cache server 802 to identify and associate the ACK/NACK's coming from the user equipment 104 received with a NATed IP address over the network 420 to the same TCP flow previously established on the cache server 802 based on the user equipment 104 private IP address. In addition, it can be challenging for the cache server 802 to map the previously known private IP address to the NATed IP address to maintain the TCP session continuity and send the remaining data packets to the user equipment's 104 NATed IP address.

In order to overcome these challenges, initially, the eNodeB associated with iBBU 404 can forward any undelivered data packets to the third party eNodeB 902. The forwarding of data can be performed over an X2 interface. The iBBU 404 can send an acknowledgement ("ACK") to the cache server 802 and, indirectly, by way of EPC 108 and network 420 (e.g., via a UDP tunnel). The ACK can be transmitted on behalf of the user equipment 104 once it has been determined that user equipment 104 has been successfully handed over to the third party eNodeB 902. Then, the user equipment 104 and the cache server 802 can continue with the TCP session. The cache server 802 can address the user equipment 104 using the user equipment's 104 NATed IP address.

Thus, each user equipment 104 redirected to download from the cache server 802 can be assigned a unique port to establish the TCP session. The session identification can be based only on the port number regardless of the source IP address. The cache server can maintain a mapping of session identification to user equipment 104 IP address based on a last received IP packet from the user equipment 104. For example, the last received IP packet from the user equipment 104 can include the last known source address in the IP header of the last packet received from the user equipment 104.

In some implementations, at handover time, the eNodeB associated with iBBU 404 can send an ACK packet to the cache server 802 on behalf of the user equipment 104 to allow the cache server 802 to extract the NATed IP address of the user equipment 104.

Figure 10:
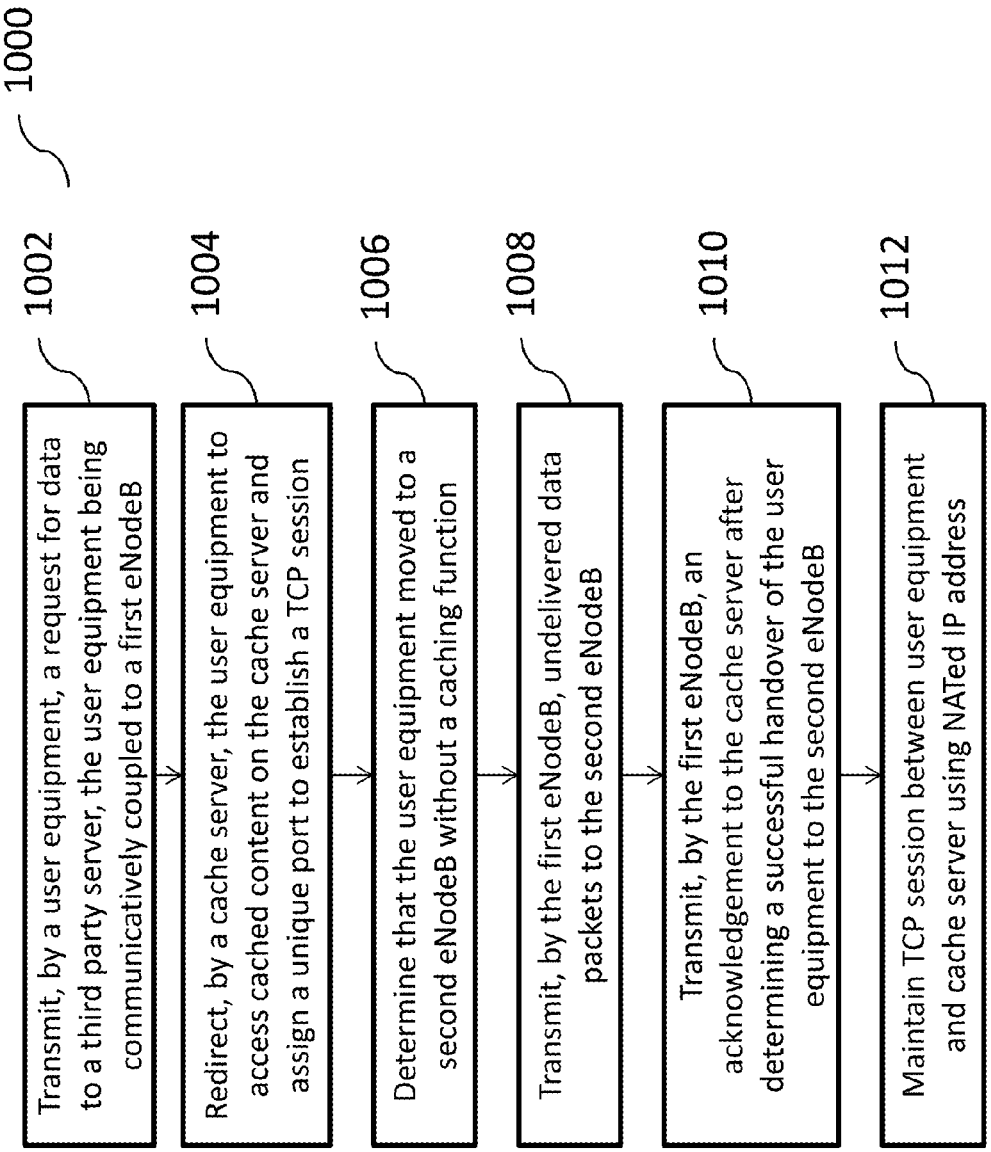
FIG. 10 illustrates an exemplary method for using a port-based flow identification system shown in FIG. 9, according to some implementations of the current subject matter.

FIG. 10 illustrates an exemplary method 1000 for using a port-based flow identification system 900, according to some implementations of the current subject matter. At 1002, a user equipment, (e.g., user equipment 104 as shown in FIG. 9) can transmit a request for data to a third party server (e.g., server 804) for data (e.g., text, HTML, video, audio, etc.). The user equipment can be communicatively coupled to a first eNodeB (e.g., an iBBU 404 and iRRH 402, as shown in FIG. 9). The first eNodeB can be communicatively coupled to a cache server (e.g., cache server 802, as shown in FIG. 9). At 1004, the cache server can redirect the user equipment to access a cached content that can be cached/stored on the cache server. The cache server can also request that the user equipment establish a TCP session with the server on a particular IP and port number. At 1006, a determination can be made that the user equipment has moved from one area to another area, which is serviced by another or second eNodeB (e.g., second eNodeB 902 as shown in FIG. 9). The second eNodeB does not have a local caching function or a cache server associated with it. At 1008, the first eNodeB can transmit any undelivered data packets of the requested data to the second eNodeB. At 1010, at the time of handover to the second eNodeB, the first eNodeB can transmit an acknowledgement (ACK) to the cache server after a determination that a successful handover has been completed. The ACK is transmitted by the first eNodeB to the second eNodeB on behalf of the user equipment. At 1012, the established TCP session can be maintained between the user equipment and the cache server, where the cache server uses user equipment's NATed IP address.

Figure 11:
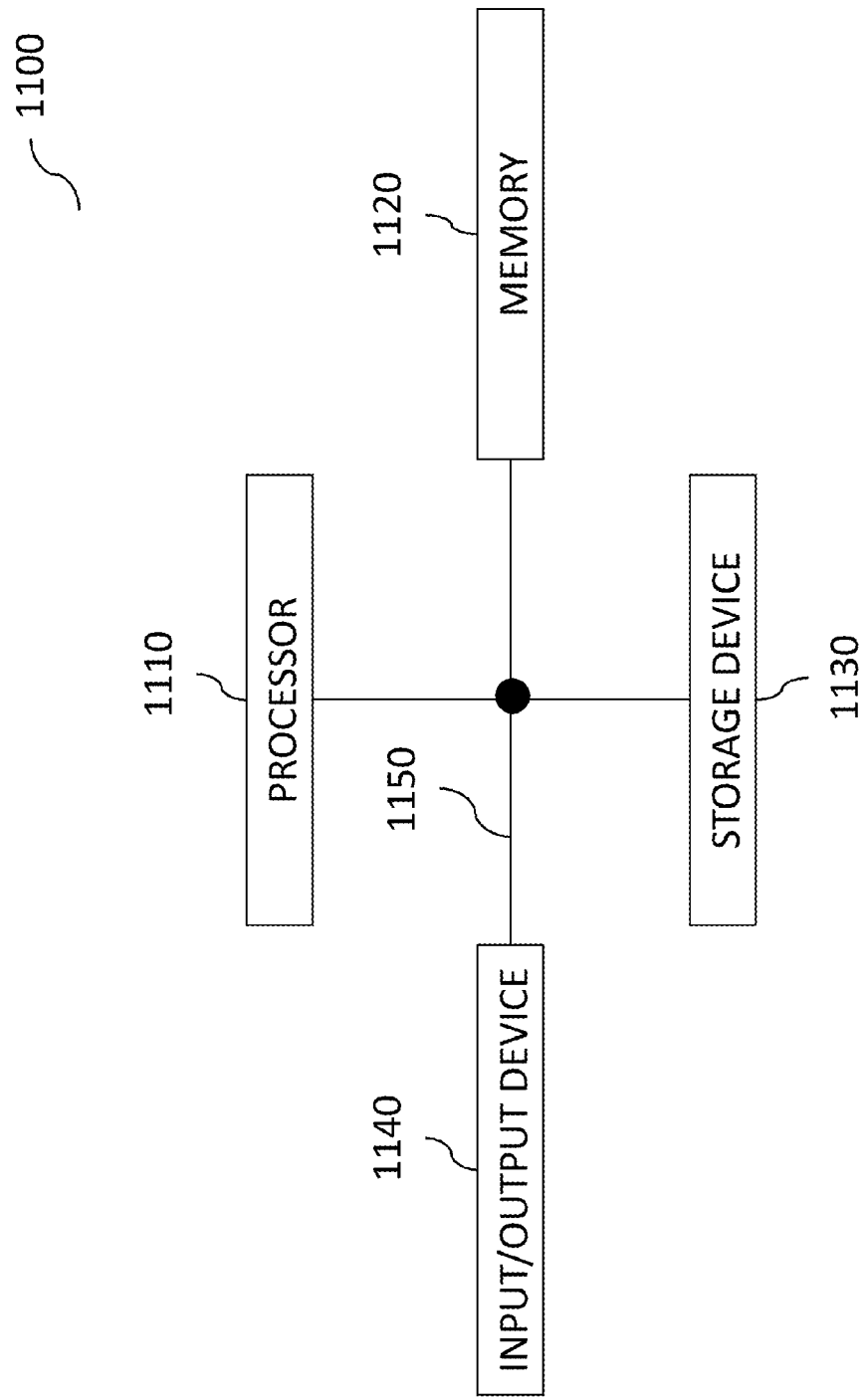
FIG. 11 illustrates an exemplary system, according to some implementations of the current subject matter.

In some implementations, the current subject matter can be configured to be implemented in a system 1100, as shown in FIG. 11. The system 1100 can include one or more of a processor 1110, a memory 1120, a storage device 1130, and an input/output device 1140. Each of the components 1110, 1120, 1130 and 1140 can be interconnected using a system bus 1150. The processor 1110 can be configured to process instructions for execution within the system 400. In some implementations, the processor 1110 can be a single-threaded processor. In alternate implementations, the processor 1110 can be a multi-threaded processor. The processor 1110 can be further configured to process instructions stored in the memory 1120 or on the storage device 1130, including receiving or sending information through the input/output device 1140. The memory 1120 can store information within the system 1100. In some implementations, the memory 1120 can be a computer-readable medium. In alternate implementations, the memory 1120 can be a volatile memory unit. In yet some implementations, the memory 1120 can be a non-volatile memory unit. The storage device 1130 can be capable of providing mass storage for the system 1100. In some implementations, the storage device 1130 can be a computer-readable medium. In alternate implementations, the storage device 1130 can be a floppy disk device, a hard disk device, an optical disk device, a tape device, non-volatile solid state memory, or any other type of storage device. The input/output device 1140 can be configured to provide input/output operations for the system 1100. In some implementations, the input/output device 1140 can include a keyboard and/or pointing device. In alternate implementations, the input/output device 1140 can include a display unit for displaying graphical user interfaces.

Figure 12:
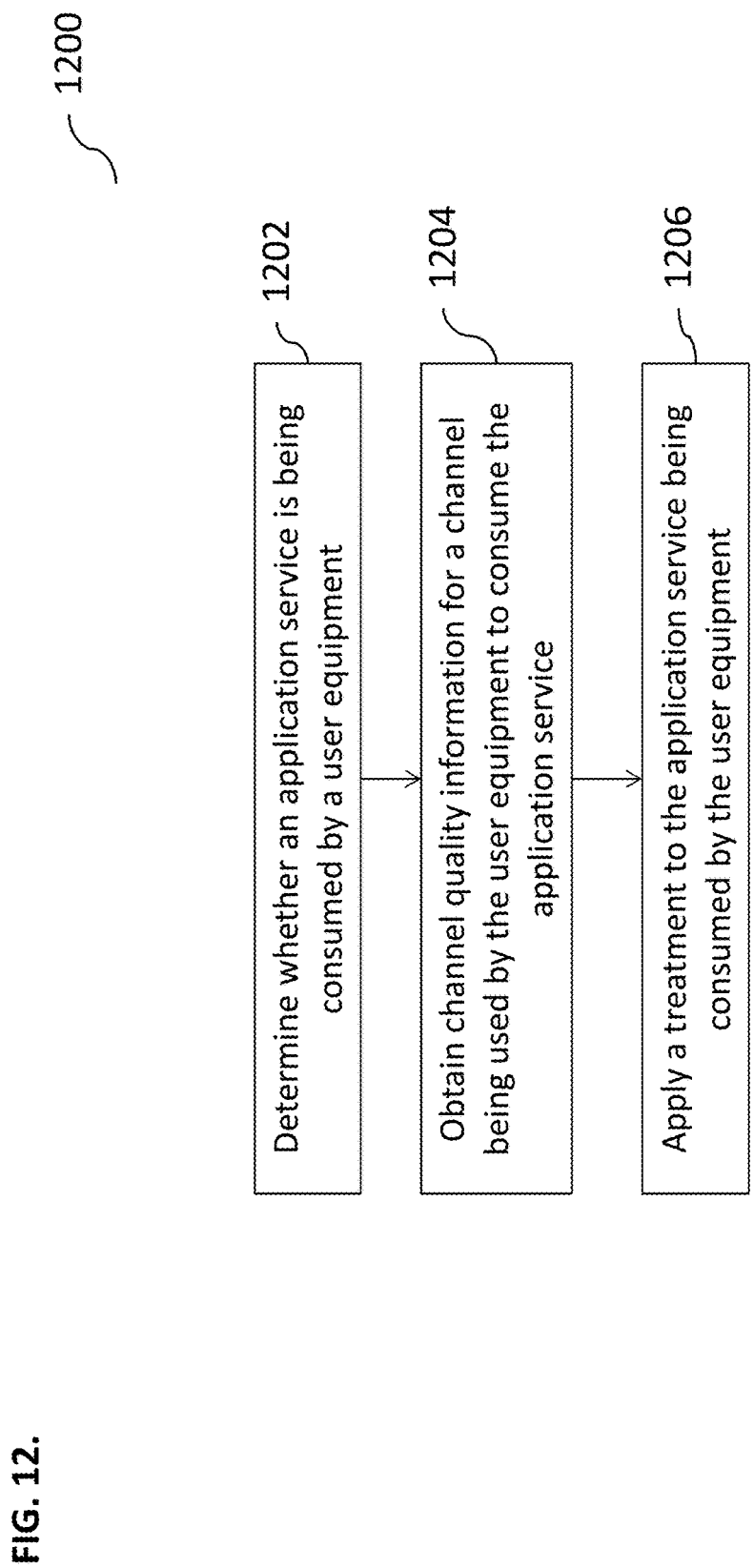
FIG. 12 illustrates an exemplary method, according to some implementations of the current subject matter.

FIG. 12 illustrates an exemplary method 1200 for transmission of data packets, according to some implementations of the current subject matter. At 1202, a determination can be made as to whether an application service is being consumed by a user equipment. At 1204, channel quality information for a channel being used by the user equipment to consume the application service can be obtained. At 1206, a treatment to the application service being consumed by the user equipment can be applied based on the obtained channel quality information.

In some implementations, the current subject matter can include one or more of the following optional features. An evolved node (eNodeB) base station can perform at least one of the determining, the obtaining and the applying. The eNodeB base station can include at least one processor and the at least one memory.

In some implementations, the determination of whether an application service is being consumed can be made based on at least one subscription preference associated with the application service. In some implementations, the method can further include transmitting at least one data packet associated with the application service and stored in the at least one memory from the base station to the user equipment.

In some implementations, the channel quality information can include at least one of the following: a quality channel indicator ("QCI"), an available bandwidth, latency, jitter, a cell load, a mobile/stationary state of the user equipment and/or any combination thereof. The method can also include performing redirection of an uplink transmission associated with the application service to a server communicatively coupled to the base station. The treatment can include at least one of the following: a prioritized delivery of a data packet associated with the application service, a reliable delivery of a data packet associated with the application service, and a redirection of a data packet associated with the application service to a predetermined tunnel.

Figure 13:
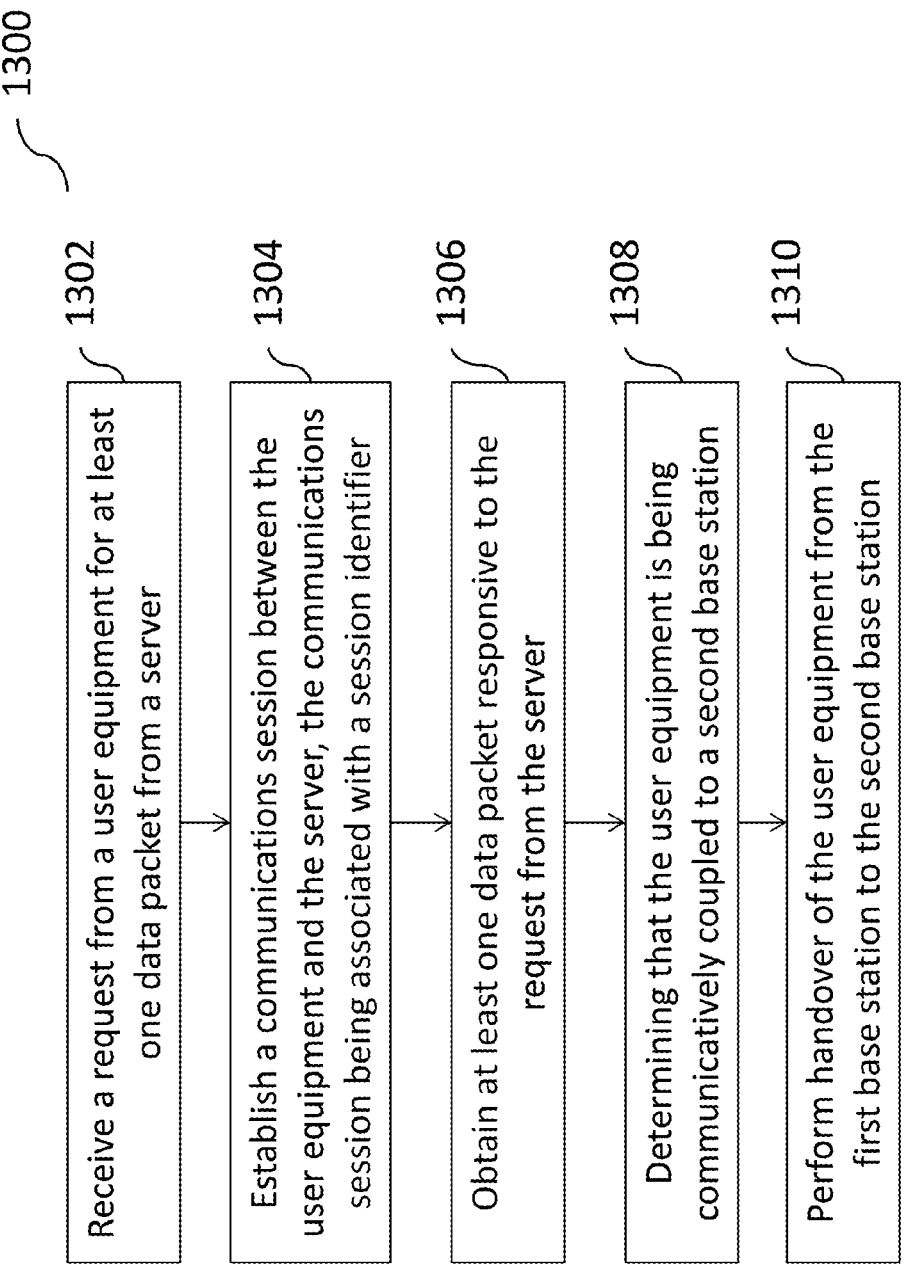
FIG. 13 illustrates another exemplary method, according to some implementations of the current subject matter.

FIG. 13 illustrates an exemplary method 1300 for transmission of data packets using port-based flow identification, according to some implementations of the current subject matter. At 1302, a first base station can receive a request from a user equipment for at least one data packet (e.g., video, audio, text, data, etc.) from a server (e.g., a cache server). At 1304, the first base station can establish a communications session between the user equipment and the server. The communications session can be associated with a specific session identifier. At 1306, at least one data packet responsive to the request can be obtained from the server. At 1308, the first base station can determine that the user equipment is being communicatively coupled to a second base station (e.g., the user equipment has moved from one eNodeB to another eNodeB). At 1310, the first base station can perform handover of the user equipment to the second base station. The communication session can be maintained between the user equipment and the server using the second base station subsequent to the server receiving an acknowledgement ("ACK") from the first base station.

In some implementations, the current subject matter can include one or more of the following optional features. The first base station and/or the second base station can be an evolved node (eNodeB) base station, where the eNodeB base station can include at least one processor and at least one memory (as discussed above). The data packet can be a cached data packet stored by the server (e.g., a cache server).

In some implementations, the session identifier can be determined based on a port number of the first base station. The session identifier can be mapped to an internet protocol address of the user equipment based on at least one data packet received from the user equipment and the mapping can be stored by the server. Further, the session identifier can be mapped to the internet protocol address of the user equipment based on an internet protocol header of the data packet (e.g., last data packet) received from the user equipment. The internet protocol address of the user equipment can be a network address translated internet protocol address.

In some implementations, the communication session can be a transmission control protocol ("TCP") session.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method for transmission of data packets, the method comprising:
   determining whether an application service is being consumed by a user equipment;
   obtaining channel quality information for a channel being used by the user equipment to consume the application service;
   establishing a tunnel for off-loading at least one service flow associated with the application service, the tunnel being used for receiving and transmitting one or more flows associated with the application service;
   receiving a configuration information of the application service;
   determining, using the received configuration information of the application service, at least one mode for transmission of at least one data packet to and from the user equipment, the at least one mode including a redirect mode and a mirror mode, wherein
   in the redirect mode,
      determining, using the received configuration information of the application service and at least one filter table, at least one data packet for tunneling using the established tunnel, and
      redirecting transmission of at least one downlink packet using the established tunnel;
   in the mirror mode,
      transmitting at least one uplink data packet from the user equipment to the application service and an evolved packet core, and
      transmitting a downlink data packet to at least the application service using the established tunnel; and
   applying, based on the obtained channel quality information, a treatment to the application service being consumed by the user equipment on the established tunnel.

2. The method according to claim 1, wherein an evolved node (eNodeB) base station performs at least one of the determining, the obtaining and the applying, the eNodeB base station comprising the at least one processor and the at least one memory.

3. The method according to claim 2, wherein the determining is based on at least one subscription preference associated with the application service.

4. The method according to claim 3, further comprising transmitting, using the at least one processor, at least one data packet associated with the application service and stored in the at least one memory from the base station to the user equipment.

5. The method according to claim 3, wherein the channel quality information includes at least one of the following: a quality channel indicator ("QCI"), an available bandwidth, latency, jitter, a cell load, a mobile/stationary state of the user equipment and/or any combination thereof.

6. The method according to claim 3, further comprising performing redirection of an uplink transmission associated with the application service to a server communicatively coupled to the base station.

7. The method according to claim 3, wherein the treatment includes at least one of the following: a prioritized delivery of a data packet associated with the application service, a reliable delivery of a data packet associated with the application service, and a redirection of a data packet associated with the application service to a predetermined tunnel.

8. An apparatus comprising:
   at least one programmable processor; and
   a machine-readable medium storing instructions that, when executed by the at least one programmable processor, cause the at least one programmable processor to perform operations comprising:
      determining whether an application service is being consumed by a user equipment;
      obtaining channel quality information for a channel being used by the user equipment to consume the application service;
      establishing a tunnel for off-loading at least one service flow associated with the application service, the tunnel being used for receiving and transmitting one or more flows associated with the application service;
      receiving a configuration information of the application service;
      determining, using the received configuration information of the application service, at least one mode for transmission of at least one data packet to and from the user equipment, the at least one mode including a redirect mode and a mirror mode, wherein
      in the redirect mode,
         determining, using the received configuration information of the application service and at least one filter table, at least one data packet for tunneling using the established tunnel, and
         redirecting transmission of at least one downlink packet using the established tunnel;
      in the mirror mode,
         transmitting at least one uplink data packet from the user equipment to the application service and an evolved packet core, and transmitting a downlink data packet to at least the application service using the established tunnel; and applying, based on the obtained channel quality information, a treatment to the application service being consumed by the user equipment on the established tunnel.

9. The apparatus according to claim 8, wherein an evolved node (eNodeB) base station performs at least one of the determining, the obtaining and the applying, the eNodeB base station comprising the at least one processor and the at least one memory.

10. The apparatus according to claim 9, wherein the determining is based on at least one subscription preference associated with the application service.

11. The apparatus according to claim 10, wherein the operations further comprise
transmitting, using the at least one processor, at least one data packet associated with the application service and stored in the at least one memory from the base station to the user equipment.

12. The apparatus according to claim 10, wherein the channel quality information includes at least one of the following: a quality channel indicator ("QCI"), an available bandwidth, latency, jitter, a cell load, a mobile/stationary state of the user equipment and/or any combination thereof.

13. The apparatus according to claim 10, wherein the operations further comprise performing redirection of an uplink transmission associated with the application service to a server communicatively coupled to the base station.

14. The apparatus according to claim 10, wherein the treatment includes at least one of the following: a prioritized delivery of a data packet associated with the application service, a reliable delivery of a data packet associated with the application service, and a redirection of a data packet associated with the application service to a predetermined tunnel.

15. A computer program product comprising a non-transitory machine-readable medium storing instructions that, when executed by at least one programmable processor, cause the at least one programmable processor to perform operations comprising:
determining whether an application service is being consumed by a user equipment;
obtaining channel quality information for a channel being used by the user equipment to consume the application service;
establishing a tunnel for off-loading at least one service flow associated with the application service, the tunnel being used for receiving and transmitting one or more flows associated with the application service;
receiving a configuration information of the application service;
determining, using the received configuration information of the application service, at least one mode for transmission of at least one data packet to and from the user equipment, the at least one mode including a redirect mode and a mirror mode, wherein
in the redirect mode,
determining, using the received configuration information of the application service and at least one filter table, at least one data packet for tunneling using the established tunnel, and
redirecting transmission of at least one downlink packet using the established tunnel;
in the mirror mode, transmitting at least one uplink data packet from the user equipment to the application service and an evolved packet core, and
transmitting a downlink data packet to at least the application service using the established tunnel; and applying, based on the obtained channel quality information, a treatment to the application service being consumed by the user equipment on the established tunnel.

16. The computer program product according to claim 15, wherein an evolved node (eNodeB) base station performs at least one of the determining, the obtaining and the applying, the eNodeB base station comprising the at least one processor and the at least one memory.

17. The computer program product according to claim 16, wherein the determining is based on at least one subscription preference associated with the application service.

18. The computer program product according to claim 17, wherein the operations further comprise
transmitting, using the at least one processor, at least one data packet associated with the application service and stored in the at least one memory from the base station to the user equipment.

19. The computer program product according to claim 17, wherein the channel quality information includes at least one of the following: a quality channel indicator ("QCI"), an available bandwidth, latency, jitter, a cell load, a mobile/stationary state of the user equipment and/or any combination thereof.

20. The computer program product according to claim 17, wherein the operations further comprise performing redirection of an uplink transmission associated with the application service to a server communicatively coupled to the base station.

21. The computer program product according to claim 17, wherein the treatment includes at least one of the following: a prioritized delivery of a data packet associated with the application service, a reliable delivery of a data packet associated with the application service, and a redirection of a data packet associated with the application service to a predetermined tunnel.

22. A computer-implemented method for transmission of data packets, the method comprising:
receiving, by a first base station, a request from a user equipment for at least one data packet associated with at least one application service from a server;
establishing, by the first base station, a communications session between the user equipment and the server, the communications session being associated with a session identifier;
obtaining at least one data packet from the server, the at least one data packet being responsive to the request from the user equipment;
determining, by the first base station, that the user equipment is being communicatively coupled to a second base station; and
performing, by the first base station, handover of the user equipment from the first base station to the second base station, wherein the communication session is maintained between the user equipment and the server using the second base station subsequent to the server receiving an acknowledgement from the first base station, wherein the performing includes
establishing a tunnel for off-loading at least one service flow associated with the application service, the tunnel being used for receiving and transmitting one or more flows associated with the communication session;
receiving a configuration information of the application service;
determining, using the received configuration information of the application service, at least one mode for transmission of at least one data packet to and from the user equipment, the at least one mode including a redirect mode and a mirror mode, wherein
in the redirect mode,
determining, using the received configuration information of the application service and at least one filter table, at least one data packet for tunneling using the established tunnel, and
redirecting transmission of at least one downlink packet using the established tunnel;
in the mirror mode,
transmitting at least one uplink data packet from the user equipment to the application service and an evolved packet core, and
transmitting a downlink data packet to at least the application service using the established tunnel; and
applying, based on the obtained channel quality information, a treatment to the application service being consumed by the user equipment on the established tunnel.

23. The method according to claim 22, wherein at least one of the first base station and the second base station is an evolved node (eNodeB) base station, the eNodeB base station comprising at least one processor and at least one memory.

24. The method according to claim 22, wherein the at least one data packet is a cached data packet stored by the server.

25. The method according to claim 22, wherein the session identifier is determined based on a port number of the first base station.

26. The method according to claim 25, wherein the session identifier is mapped to an internet protocol address of the user equipment based on at least one data packet received from the user equipment.

27. The method according to claim 26, wherein the session identifier is mapped to the internet protocol address of the user equipment based on an internet protocol header of the at least one data packet received from the user equipment.

28. The method according to claim 26, wherein the internet protocol address of the user equipment is a network address translated internet protocol address.

29. The method according to claim 22, wherein the communication session is a transmission control protocol session.

30. An apparatus comprising:
at least one programmable processor; and
a machine-readable medium storing instructions that, when executed by the at least one programmable processor, cause the at least one programmable processor to perform operations comprising:
receiving, by a first base station, a request from a user equipment for at least one data packet associated with at least one application service from a server;
establishing, by the first base station, a communications session between the user equipment and the server, the communications session being associated with a session identifier;
obtaining at least one data packet from the server, the at least one data packet being responsive to the request from the user equipment;
determining, by the first base station, that the user equipment is being communicatively coupled to a second base station; and
performing, by the first base station, handover of the user equipment from the first base station to the second base station, wherein the communication session is maintained between the user equipment and the server using the second base station subsequent to the server receiving an acknowledgement from the first base station, wherein the performing includes
establishing a tunnel for off-loading at least one service flow associated with the application service, the tunnel being used for receiving and transmitting one or more flows associated with the communication session;
receiving a configuration information of the application service;
determining, using the received configuration information of the application service, at least one mode for transmission of at least one data packet to and from the user equipment, the at least one mode including a redirect mode and a mirror mode, wherein
in the redirect mode,
determining, using the received configuration information of the application service and at least one filter table, at least one data packet for tunneling using the established tunnel, and
redirecting transmission of at least one downlink packet using the established tunnel;
in the mirror mode,
transmitting at least one uplink data packet from the user equipment to the application service and an evolved packet core, and
transmitting a downlink data packet to at least the application service using the established tunnel; and
applying, based on the obtained channel quality information, a treatment to the application service being consumed by the user equipment on the established tunnel.

31. The apparatus according to claim 30, wherein at least one of the first base station and the second base station is an evolved node (eNodeB) base station, the eNodeB base station comprising at least one processor and at least one memory.

32. The apparatus according to claim 30, wherein the at least one data packet is a cached data packet stored by the server.

33. The apparatus according to claim 30, wherein the session identifier is determined based on a port number of the first base station.

34. The apparatus according to claim 33, wherein the session identifier is mapped to an internet protocol address of the user equipment based on at least one data packet received from the user equipment.

35. The apparatus according to claim 34, wherein the session identifier is mapped to the internet protocol address of the user equipment based on an internet protocol header of the at least one data packet received from the user equipment.

36. The apparatus according to claim 34, wherein the internet protocol address of the user equipment is a network address translated internet protocol address.

37. The apparatus according to claim 30, wherein the communication session is a transmission control protocol session.

38. A computer program product comprising a non-transitory machine-readable medium storing instructions that, when executed by at least one programmable processor, cause the at least one programmable processor to perform operations comprising:
receiving, by a first base station, a request from a user equipment for at least one data packet associated with at least one application service from a server;
establishing, by the first base station, a communications session between the user equipment and the server, the communications session being associated with a session identifier;
obtaining at least one data packet from the server, the at least one data packet being responsive to the request from the user equipment;
determining, by the first base station, that the user equipment is being communicatively coupled to a second base station; and
performing, by the first base station, handover of the user equipment from the first base station to the second base station, wherein the communication session is maintained between the user equipment and the server using the second base station subsequent to the server receiving an acknowledgement from the first base station, wherein the performing includes
establishing a tunnel for off-loading at least one service flow associated with the application service, the tunnel being used for receiving and transmitting one or more flows associated with the communication session;
receiving a configuration information of the application service;
determining, using the received configuration information of the application service, at least one mode for transmission of at least one data packet to and from the user equipment, the at least one mode including a redirect mode and a mirror mode, wherein
in the redirect mode,
determining, using the received configuration information of the application service and at least one filter table, at least one data packet for tunneling using the established tunnel, and
redirecting transmission of at least one downlink packet using the established tunnel;
in the mirror mode,
transmitting at least one uplink data packet from the user equipment to the application service and an evolved packet core, and
transmitting a downlink data packet to at least the application service using the established tunnel; and
applying, based on the obtained channel quality information, a treatment to the application service being consumed by the user equipment on the established tunnel.

39. The computer program product according to claim 38, wherein at least one of the first base station and the second base station is an evolved node (eNodeB) base station, the eNodeB base station comprising at least one processor and at least one memory.

40. The computer program product according to claim 38, wherein the at least one data packet is a cached data packet stored by the server.

41. The computer program product according to claim 38, wherein the session identifier is determined based on a port number of the first base station.

42. The computer program product according to claim 41, wherein the session identifier is mapped to an internet protocol address of the user equipment based on at least one data packet received from the user equipment.

43. The computer program product according to claim 42, wherein the session identifier is mapped to the internet protocol address of the user equipment based on an internet protocol header of the at least one data packet received from the user equipment.

44. The computer program product according to claim 42, wherein the internet protocol address of the user equipment is a network address translated internet protocol address.

45. The computer program product according to claim 38, wherein the communication session is a transmission control protocol session.

* * * * *